(12) United States Patent
Lagakos et al.

(10) Patent No.: US 8,195,013 B2
(45) Date of Patent: Jun. 5, 2012

(54) MINIATURE FIBER OPTIC TEMPERATURE SENSORS

(75) Inventors: Nicholas Lagakos, Silver Spring, MD (US); Joseph A Bucaro, Herndon, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 346 days.

(21) Appl. No.: 12/692,830

(22) Filed: Jan. 25, 2010

(65) Prior Publication Data

US 2011/0044575 A1 Feb. 24, 2011

Related U.S. Application Data

(60) Provisional application No. 61/235,157, filed on Aug. 19, 2009.

(51) Int. Cl.
*G02B 6/00* (2006.01)
(52) U.S. Cl. ............................................. 385/12; 385/28
(58) Field of Classification Search .................. 385/12, 385/28; 374/188, 205, E05.037
See application file for complete search history.

(56) References Cited

U.S. PATENT DOCUMENTS

| | | | |
|---|---|---|---|
| 4,162,397 A | 7/1979 | Bucaro et al. | |
| 4,176,551 A | 12/1979 | Hammer et al. | |
| 4,238,856 A | 12/1980 | Bucaro et al. | |
| 4,363,114 A | 12/1982 | Bucaro et al. | |
| 4,427,263 A | 1/1984 | Lagakos et al. | |
| 4,482,205 A | 11/1984 | Lagakos et al. | |
| 4,592,664 A * | 6/1986 | Bijlenga et al. | 374/131 |
| 4,621,896 A | 11/1986 | Lagakos et al. | |
| 4,672,199 A * | 6/1987 | Anderson et al. | 250/227.21 |
| 4,749,856 A | 6/1988 | Walker et al. | |
| 4,764,671 A | 8/1988 | Park | |
| 4,799,751 A | 1/1989 | Tekippe | |
| 4,800,267 A | 1/1989 | Freal et al. | |
| 4,805,630 A | 2/1989 | Storey | |
| 4,930,862 A | 6/1990 | Miers et al. | |
| 4,979,798 A | 12/1990 | Lagakos et al. | |
| 4,994,668 A | 2/1991 | Lagakos et al. | |
| 5,146,083 A | 9/1992 | Zuckerwar et al. | |
| 5,258,614 A | 11/1993 | Kidwell et al. | |

(Continued)

OTHER PUBLICATIONS

Bucaro J.A.,Lagakos, N., "Fiber Optics Pressure and Acceleration Sensors", Proceeding of the 47th International Instrument symposium,Denver, CO (May 6-10, 2001).

(Continued)

*Primary Examiner* — Ellen Kim
(74) *Attorney, Agent, or Firm* — Amy L. Ressing; Sally A. Ferrett

(57) ABSTRACT

An intensity-based fiber optic temperature sensor having a fiber probe with a multimode transmit/receive fiber, a reflector spaced apart from the end of the fiber, and a housing affixed at its ends to the fiber probe and reflector, the housing having a larger or smaller thermal expansion coefficient than those of the fiber probe and reflector. Temperature changes cause a change in the gap distance between the fiber end and the reflector, changing the amount of reflected light coupled into the optical fiber. Temperature sensors can also have a fiber probe with two or more multimode receiving fibers surrounding a transmitting fiber. Other temperature sensors include a fiber probe with a multimode transmitting fiber, a reference multimode receiving fiber and a sensing multimode receiving fiber for reducing noise effects.

26 Claims, 17 Drawing Sheets

U.S. PATENT DOCUMENTS

| | | | |
|---|---|---|---|
| 5,279,793 | A | 1/1994 | Glass |
| 5,295,206 | A | 3/1994 | Mischenko |
| 5,301,001 | A | 4/1994 | Murphy et al. |
| 5,345,519 | A | 9/1994 | Lu |
| 5,355,423 | A | 10/1994 | Phillips |
| 5,367,376 | A | 11/1994 | Lagakos et al. |
| 5,594,819 | A | 1/1997 | Narendran et al. |
| 5,633,960 | A | 5/1997 | Lagakos et al. |
| 5,726,744 | A | 3/1998 | Ferdinand et al. |
| 5,805,753 | A | 9/1998 | Lagakos et al. |
| 5,825,489 | A | 10/1998 | Lagakos et al. |
| 5,870,511 | A * | 2/1999 | Sawatari et al. .............. 385/12 |
| 6,069,686 | A * | 5/2000 | Wang et al. ................. 356/35.5 |
| 6,118,534 | A | 9/2000 | Miller |
| 6,141,098 | A * | 10/2000 | Sawatari et al. ............. 356/477 |
| 6,281,976 | B1 | 8/2001 | Taylor et al. |
| 6,439,055 | B1 | 8/2002 | Maron et al. |
| 6,539,136 | B1 | 3/2003 | Dianov et al. |
| 6,577,402 | B1 | 6/2003 | Miller |
| 6,597,820 | B1 | 7/2003 | Sheem |
| 6,659,640 | B2 | 12/2003 | Ruffa |
| 6,701,775 | B1 | 3/2004 | Popielas et al. |
| 6,738,145 | B2 | 5/2004 | Sherrer et al. |
| 6,738,537 | B2 | 5/2004 | Sheem |
| 6,978,074 | B2 | 12/2005 | Shu et al. |
| 6,998,599 | B2 | 2/2006 | Lagakos et al. |
| 7,020,354 | B2 | 3/2006 | Lagakos et al. |
| 7,048,732 | B2 * | 5/2006 | Ellingsen ...................... 606/20 |
| 7,149,374 | B2 | 12/2006 | Lagakos et al. |
| 7,187,453 | B2 | 3/2007 | Belleville |
| 7,379,630 | B2 | 5/2008 | Lagakos et al. |
| 7,460,740 | B2 | 12/2008 | Lagakos et al. |
| 7,646,946 | B2 | 1/2010 | Lagakos et al. |
| 2003/0015768 | A1 | 1/2003 | Bosco et al. |
| 2005/0157305 | A1 | 7/2005 | Yu et al. |
| 2006/0005603 | A1 | 1/2006 | Chau et al. |
| 2008/0144698 | A1 | 6/2008 | Cloutier et al. |
| 2008/0212917 | A1 | 9/2008 | Chen |
| 2008/0294144 | A1 * | 11/2008 | Leo et al. ...................... 604/508 |
| 2009/0196543 | A1 | 8/2009 | Lagakos et al. |
| 2009/0202195 | A1 | 8/2009 | Lagakos et al. |

OTHER PUBLICATIONS

Bucaro J.A., Lagakos, N.,"Lightweight Fiber Optics Microphones and Accelerometers," Review of Scientific Instruments, vol. 72, pp. 2816-2821 (Jun. 2001).

Krohn, D.A., Fiber Optic Sensors—Fundamentals and Applications, Instrument Society of America, Research Triangle Park, NC, Chapters 3 and 8, 1992.

Lagakos N., Cole J.H., and Bucaro J.A., "Microbend Fiber-optic Sensor," Applied Optics 26, p. 2171-2180 (Jun. 1987).

Lagakos, N., Trott, W., Hickman, T., Cole, J., Bucaro, J., "Microbend fiber-optic sensor as extended hydrophone", IEEE Journal of Quantum Electronics, vol. 18, Issue 10, pp. 1633-1638, Oct. 1982.

Miers, D.R. ,Raj, D., Berthold, J.W. , "Design and characterization of fiber optic accelerometer," Fiber Optic and Laser Sensors V, Proc. Soc., SPIE vol. 838, pp. 314-317 (1987).

He, G. and Cuomo, F.W., "Displacement Response, Detection Limit, and Dynamic Range of Fiber-Optic Lever Sensors", J. Lightwave Tech., vol. 9, No. 11, Nov. 1991, pp. 1618-1625.

Hu, A., Cuomo, F.W., Zuckerwar, J., "Theoretical and Experimental Study of a Fiber Optic Microphone", J. Acoustical Society of America, vol. 91, pp. 3049-3060, 1992.

Zuckerwar, A.J., Cuomo, T.D., Nguyen, T.D., Rizzi, S.A., Clevenson, S.A., "High Temperature Fiber-Optic Lever Microphones", J. Acoustical Society of America, vol. 97, Issue 6, pp. 3605-3616, Jun. 1995.

Aref S.H., Zibaii M.I., and Latifa H., "An improved fiber optic pressure and temperature sensor for downhold application", Meas. Sci. Technol., vol. 20, Feb. 2009, pp. 034009-1-034009-6.

Yueming, L. Xiaoqiang, Z, and Shaojun, Z, "Novel temperature sensor based on Fabry-Perot cavity structure and micro-mechanical bi-layered membranes", SPIE Proceedings, vol. 6032, DOI:10.1117/12/667855, 7 pages, Feb. 2006.

Huang, Z., Peng, W., Xu, J., Pickrell, G.R., and Wang, A., "Fiber temperature sensor for high-pressure environment", Optical Engineering, vol. 44, No. 10, 104401-1-104401-6 (Oct. 2005).

Shimada M., Kinefuchi Y., and Takahashi K., "Sleeve-Type Ultra Miniature Optical Fiber Pressure Sensor Fabricated by DRIE", IEEE Sensors Journal, vol. 8, No. 7, Jul. 2008, pp. 1337-1341.

Totsu, K., Haga, Y., Esashi, M., "Ultra-miniature fiber-optic pressure sensor using white light interferometry", J. Micromechanics and Micromachining, vol. 15, pp. 71-75, 2005.

Katamatsu, H., et al., "Micromachined 125 um diameter ultra miniature fiber-optic pressure sensor for catheter", T. IEE Japan, vol. 120-E, No. 2, pp. 58-63 (2000).

Melamud, R. et al., "Development of an SU-8 Fabry-Perot Blood Pressure Sensor" IEEE International Conference on Micro Electro Mechanical Systems, 2005, pp. 810-813.

Written Opinion and International Search Report for PCT/US2010/043665, dated Sep. 22, 2010.

* cited by examiner

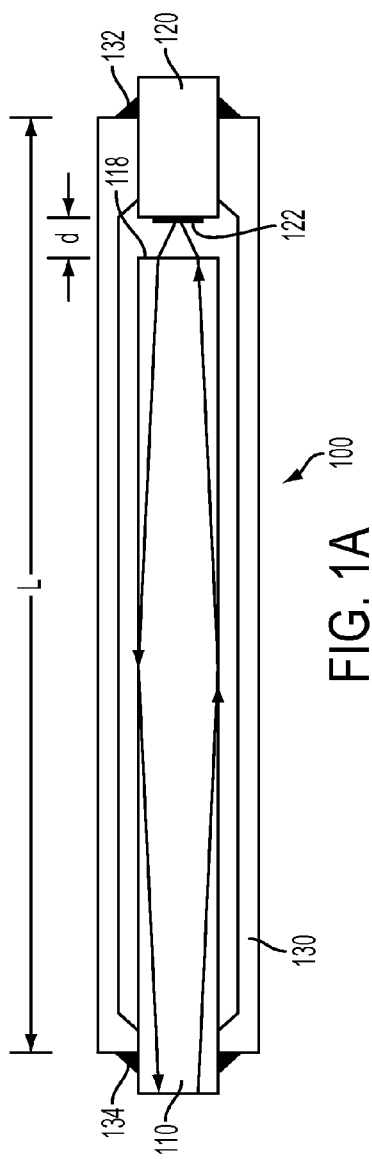
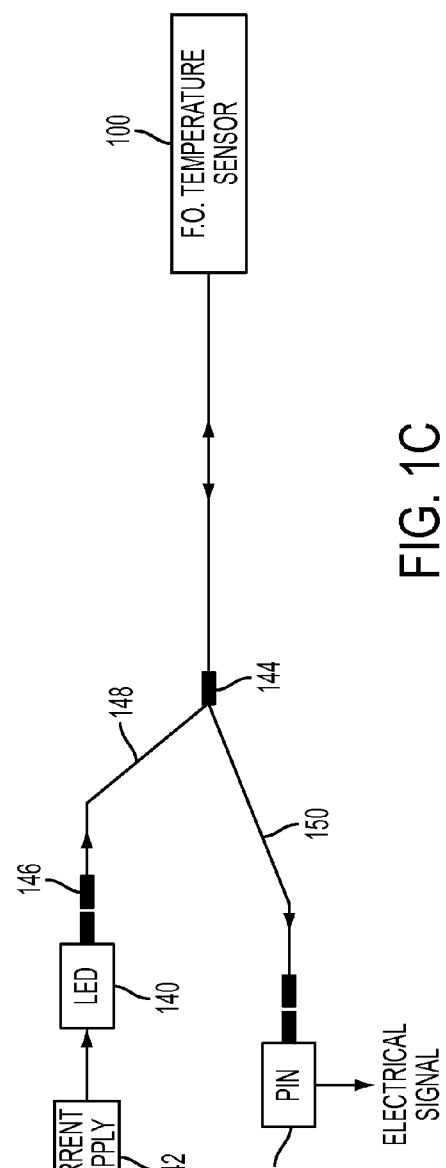
FIG. 1A
FIG. 1B
FIG. 1C

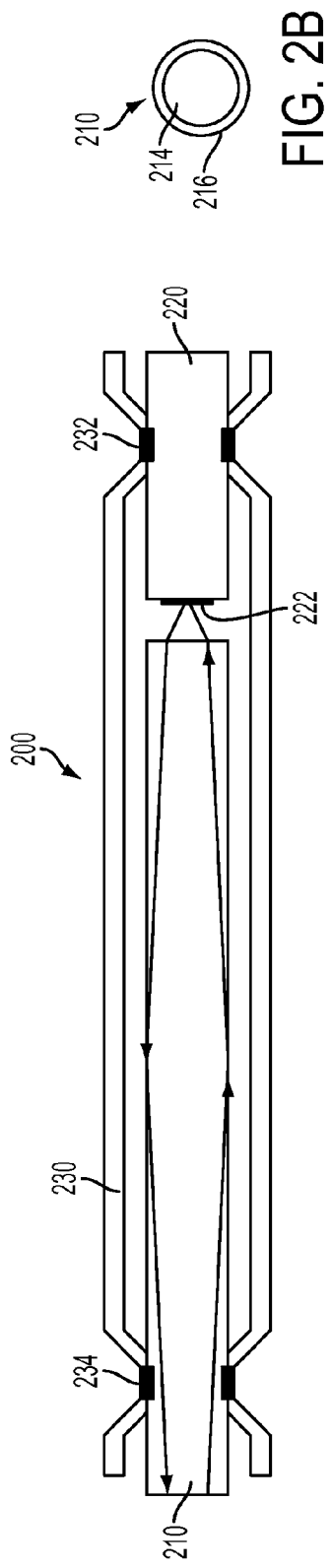
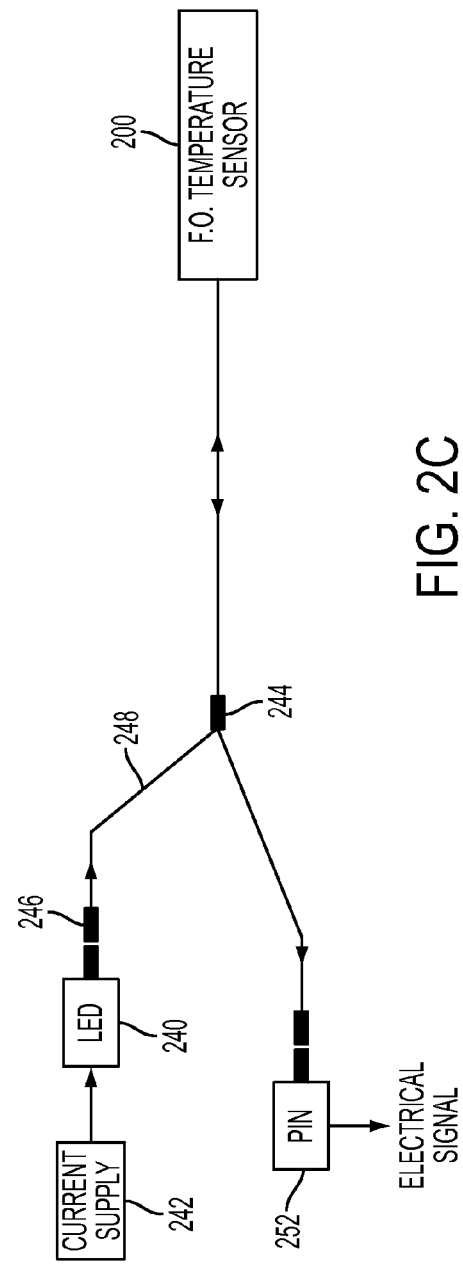
FIG. 2B
FIG. 2A
FIG. 2C

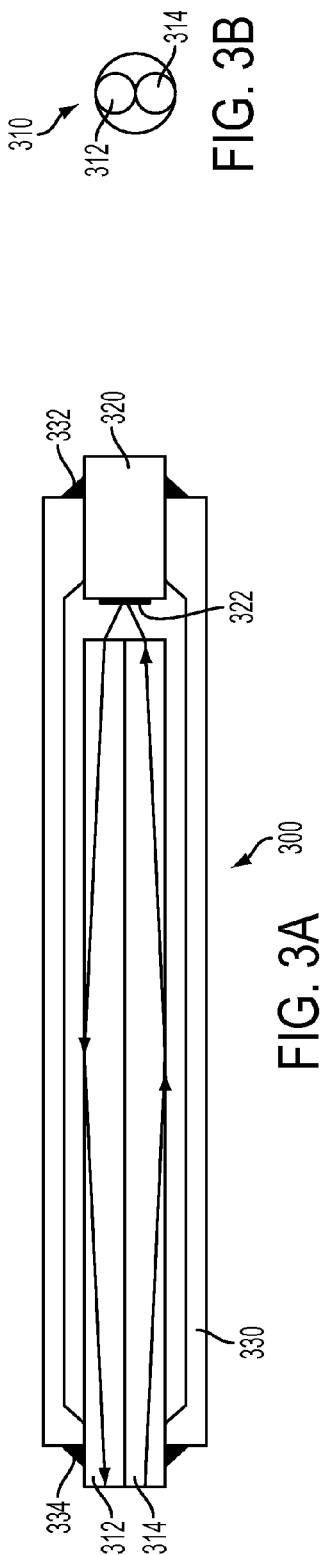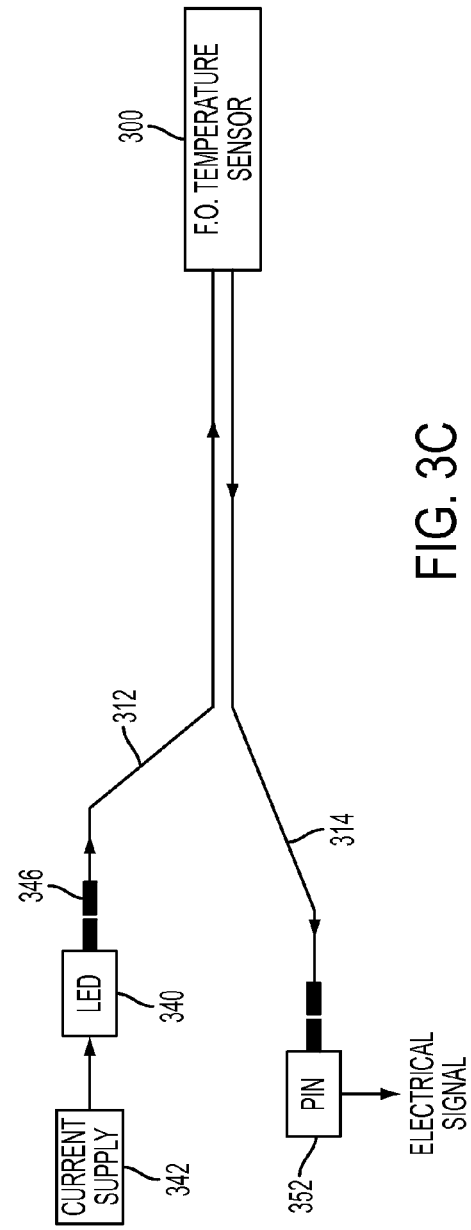
FIG. 3B
FIG. 3A
FIG. 3C

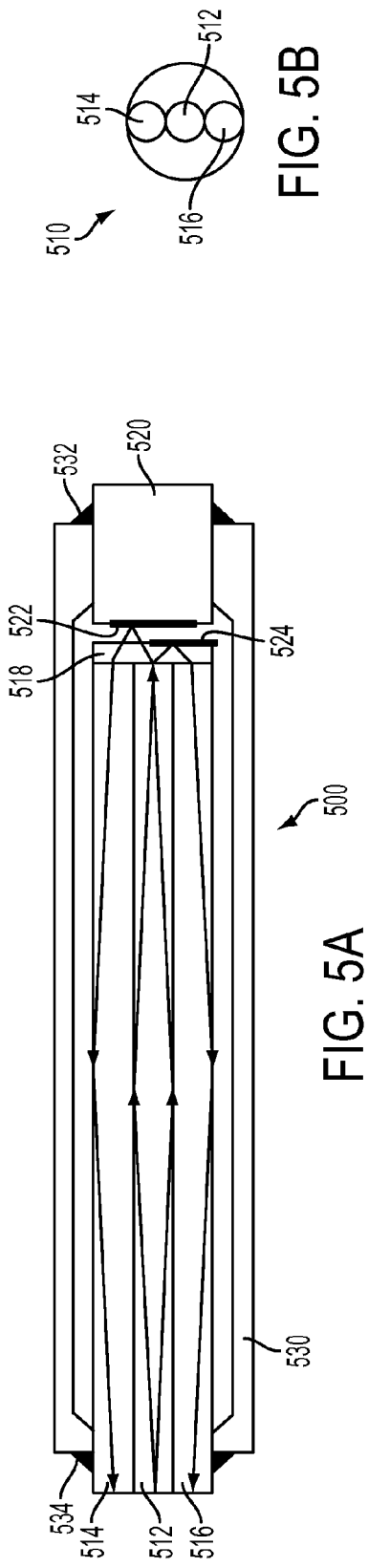
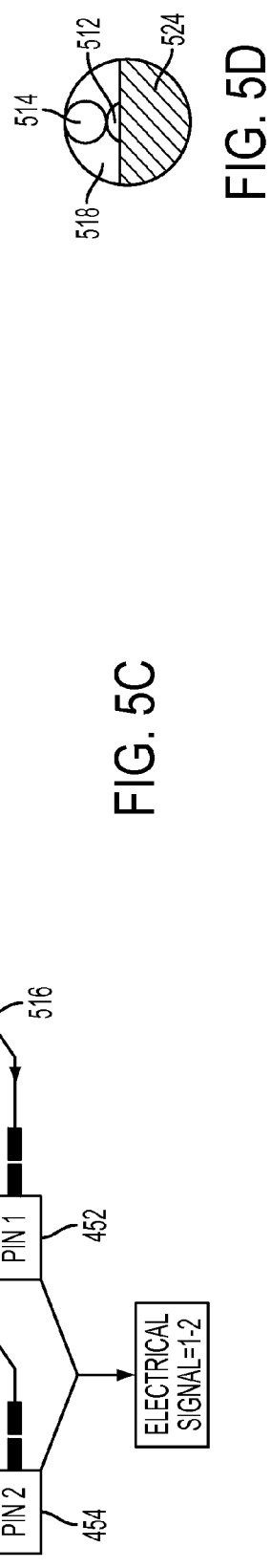
FIG. 5B
FIG. 5D
FIG. 5A
FIG. 5C

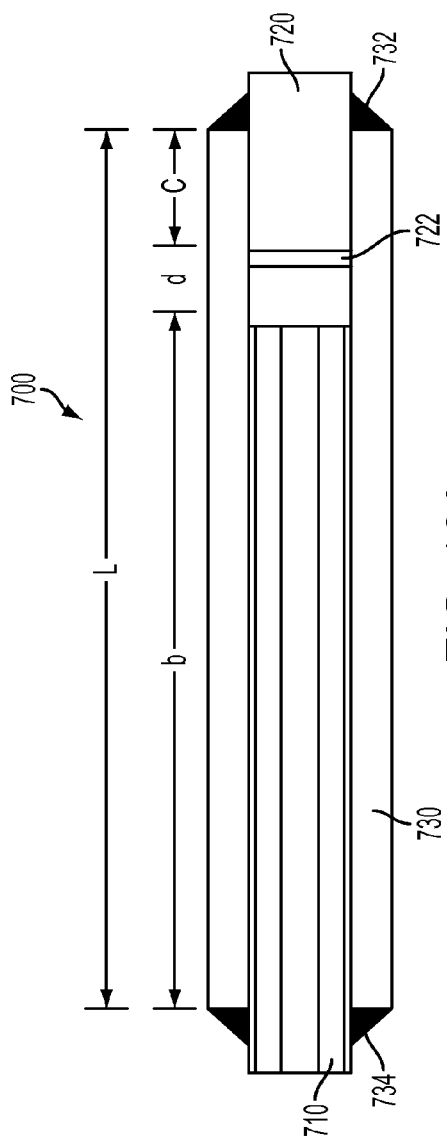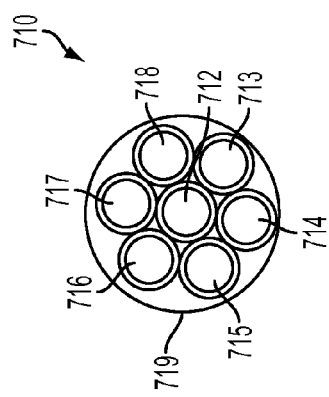
FIG. 12A
FIG. 12B

MINIATURE FIBER OPTIC TEMPERATURE SENSORS

CROSS-REFERENCE TO RELATED APPLICATIONS

This Application claims the benefit of and is a non-provisional of U.S. Provisional Application 61/235,157 filed on Aug. 19, 2009, the entire disclosure of which is incorporated herein by reference.

BACKGROUND

1. Technical Field

This patent application is related to intensity modulated fiber optic sensors, and more specifically, to fiber optic sensors for measuring temperature.

2. Related Technology

In recent years, optical fibers have formed the basis for many different types of sensors, such as microphones, static and dynamic pressure sensors, strain sensors, among others. Optical fiber sensors can use interferometry or intensity modulation. Intensity modulated fiber optic sensors, while often less sensitive than comparable interferometric sensors, are simpler and less expensive.

An interferometric fiber optic temperature sensor is disclosed in Aref, S. H., Zibaii, M. I., and Latifi, H., "An improved fiber optic pressure and temperature sensor for downhole application", Meas. Sci. Technol., Vol. 20, pp. 034009 (February 2009). Another interferometrically-based fiber optic temperature sensor system is described in Huang, Z., Peng, W., Xu, J., Pickrell, G. R., and Wang, A., "Fiber temperature sensor for high-pressure environment", Optical Engineering, Vol. 44, No. 10, pp. 104401-1-104401-6 (October 2005).

The theory of intensity modulated optical fiber sensors, including pressure sensors and microphones, and examples of such sensors, are disclosed in U.S. Pat. No. 7,379,630 to Lagakos et al., U.S. Pat. No. 7,020,354 to Lagakos et al., and U.S. Pat. No. 7,460,740 to Lagakos et al. U.S. Pat. No. 7,149,374 to Lagakos et al. discloses fiber optic pressure sensors having an etched diaphragm, and methods for forming the diaphragm. U.S. Pat. No. 7,646,946 to Lagakos et al. discloses intensity modulated fiber optic strain sensors. The entire disclosures of these documents are incorporated herein by reference.

A temperature sensor using optical interferometry with a bimetallic membrane and an optical fiber source is discussed in Yueming, L. Xiaoqiang, Z, and Shaojun, Z, "Novel temperature sensor based on Fabry-Perot cavity structure and micro-mechanical bi-layered membranes", SPIE Proceedings, Vol. 6032, DOI:10.1117/12/667855, 7 pages, February 2006.

BRIEF SUMMARY

An aspect of the invention is directed to a fiber-optic temperature sensor, having a reflector body with a reflective surface; an optical fiber probe including a multimode optical fiber for emitting light from an end of the fiber and for receiving light reflected by the reflective surface; the reflective surface being spaced apart at a distance from the end of the multimode optical fiber and positioned to receive the light emitted from the end of the multimode optical fiber and to reflect at least a portion of the light into the end of the multimode optical fiber; and a housing having a larger or smaller thermal expansion coefficient than the fiber probe, the housing being affixed to the optical fiber probe at a first location and affixed to the reflector body at a second location, wherein temperature changes are indicated by change in reflected light coupled into the multimode optical fiber. In operation, thermal expansion or contraction of the housing causes a change in the distance between the multimode optical fiber end and the reflective surface, and the change in the distance modulates the amount of light coupled into the multimode optical fiber.

Another aspect of the invention is directed to a fiber-optic temperature sensor, having a reflector body with a reflective surface; an optical fiber probe including a transmitting multimode optical fiber for emitting light from an end of the fiber, and at least one receiving multimode optical fiber for receiving light reflected by the reflector body; the reflective surface being spaced apart at a distance from the end of the multimode optical fibers and positioned to receive the light emitted from the end of the transmitting multimode optical fiber and to reflect at least a portion of the light into the end of the receiving multimode optical fiber; and a housing having a larger or smaller thermal expansion coefficient than the fiber probe, the housing being affixed to the optical fiber probe at a first location and affixed to the reflector body at a second location, wherein temperature changes are indicated by change in reflected light coupled into the at least one receiving multimode optical fiber. In operation, thermal expansion or contraction of the housing causes a change in the distance between the multimode optical fiber ends and the reflective surface, and the change in the distance modulates the amount of light received in the at least one receiving multimode optical fiber.

An aspect of the invention is directed to a fiber-optic temperature sensor, having a reflector body with a reflective surface; an optical fiber probe including a transmitting multimode optical fiber for emitting light from an end of the fiber, a first receiving multimode optical fiber and a second receiving multimode optical fiber parallel with the transmitting multimode optical fiber, a transparent glass cover arranged over the ends of the transmitting optical fiber and the receiving optical fibers, and a reflective material disposed on a portion of the transparent glass cover covering the second receiving multimode optical fiber and a portion of the transmitting optical glass fiber; the reflective surface of the reflector body being spaced apart at a distance from the transparent glass cover; and a housing having a thermal expansion coefficient smaller or larger than the thermal expansion coefficient of the fiber probe, the housing being affixed to the optical fiber probe at a first location and affixed to the reflector body at a second location. Temperature is indicated by the difference in reflected light coupled into the first receiving multimode optical fiber and the difference in reflected light coupled into the second receiving multimode optical fiber. In operation, thermal expansion or contraction of the housing causes a change in the distance between the transparent glass cover and the reflective surface of the reflector body, and the change in the distance modulates the amount of light received in the first receiving multimode optical fiber. The first receiving multimode optical fiber and said second receiving multimode optical fiber can be arranged opposite each other on either side of the transmitting multimode optical fiber.

BRIEF DESCRIPTION OF THE DRAWINGS

FIGS. 1A, 1B, and 1C illustrate a optical fiber temperature sensor system in which the sensor has having one optical fiber for transmitting light to a reflector body and for receiving light reflected by the reflector body.

FIGS. 2A, 2B, and 2C illustrate a fiber optic temperature sensor having a glass housing suitable for high temperature applications.

FIGS. 3A, 3B, and 3C illustrate a fiber optic temperature sensor and system in which the sensor has two optical fibers, one for transmitting the light from the light source, and the other for receiving a portion of the light reflected by the reflector body.

FIGS. 5A, 5B, 5C and 5D illustrate a fiber optic temperature sensor and system in which the fiber optic probe includes a reference fiber for reducing the noise effects of the LED system.

FIGS. 12A and 12B illustrate a seven-fiber fiber optic temperature sensor having a stainless steel housing.

DETAILED DESCRIPTION OF THE INVENTION

Figure 4B:
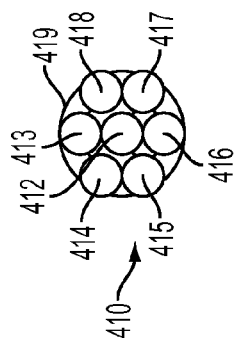
FIGS. 4A, 4B, and 4C illustrate a fiber optic temperature sensor in which the fiber optic probe has one centrally arranged transmitting multimode optical fiber and six multimode optical fibers surrounding the central fiber to receive a portion of the light reflected by a reflector body.

FIG. 1A illustrates a cut-away view of a fiber optic temperature sensor 100, which includes a single multimode optical fiber 110 for transmitting and receiving light. As shown in FIG. 1B, the multimode optical fiber 110 has a core 114 and cladding 116. The reflector body 120 and the multimode optical fiber 110 are located inside a housing 130.

There is a difference in the thermal expansion coefficient between the housing 130 and the optical fiber 110. The housing can have a higher COE or a lower COE than the optical fiber 110. Larger COE differences will provide more sensitive sensor.

Both the optical fiber 110 and the reflector body 120 are affixed to the housing in a manner that allows the housing to freely expand and contract in a longitudinal direction along the axis of the multimode fiber. The housing 130 can be affixed to the multimode fiber 110 and the reflector body 120 at the far ends of the housing to provide maximum sensor length and, thus, high thermal sensitivity. For example, as shown in FIG. 1A, the housing 130 is affixed to the multimode optical fiber 110 at an end of the housing, and the reflector body 120 is affixed to the end of the housing at the opposite end of the housing.

The optical fiber 110 has an end face 118 that is preferably well polished in order to minimize reflections at the fiber end. The end face 118 of the optical fiber is spaced apart from the reflective surface 122 of the reflector body 120 at a distance d. The gap distance d can be set to a length that will provide good sensitivity, as discussed further in later paragraphs. The gap between the optical fiber end face 118 and the reflective surface 122 can contain air, a vacuum, or another substance that is substantially transparent at the operational wavelengths.

FIG. 1C illustrates fiber optic temperature sensor system that includes the sensor 100, a light emitting diode 140 powered by a current source 142, and fiber optic coupler 144. Light from the LED is coupled into a multimode fiber 148, and the optical coupler 144 directs the LED input light into the sensor's multimode fiber 110. The coupler 144 also directs the reflected light in the sensor's multimode fiber 110 into another multimode fiber 150 toward the PIN photodetector 152. The photodetector 152 produces an electrical voltage with an amplitude that corresponds to the intensity of the light detected by the photodetector. Changes in the voltage thus indicate changes in temperature at the sensor 100.

In operation, light from a LED is coupled into the sensor's multimode optical fiber 110, propagates through the core of the multimode fiber 110 to end face 118 of the fiber, leaves the fiber, propagates through the gap between the fiber 110 and the reflective surface 122, and is reflected back toward the fiber 110. As discussed in later paragraphs, a change in the amount of light received by the fiber 110 indicates a change in the gap length. The sensor 100 is positioned in an environment. As the environmental temperature increases, the housing expands in length. The optical fiber 110 and reflector body 120 experience less of an increase in length due to their lower coefficients of thermal expansion. As the housing length increases, the distance d between the optical fiber end and the reflective surface 122 increases. The increase in gap length will cause a change in the amount of reflected light received in the optical fiber 110. Conversely, as the environmental temperature decreases, the housing contracts, and the distance d between the optical fiber end and the reflective surface 122 decreases. The decrease in gap length will cause an opposite change in the amount of reflected light received in the optical fiber 110. Thus, the received light in the sensor's multimode fiber 110 is intensity modulated by the environmental temperature change. The photodetector 152 generates an electrical signal whose amplitude corresponds to the optical intensity in the multimode fiber 150.

The distance between the end of the sensor's multimode optical fiber 110 and the reflective surface 122 can be set to a predetermined distance d at which the sensitivity of the temperature sensor is high. The optimal distances for sensitivity are discussed in later paragraphs.

The housing 130 preferably seals the sensor interior from the external environment in order to exclude dust or other contaminants from the gap.

In one example, the multimode fiber 110 is a 200 micron diameter glass core fiber with a 230 micron plastic clad (e.g., HCS, commercially available from Spectran Specialty Optics), a 500 micron Tefzel coating, and a 0.37 numerical aperture. The multimode fiber 110 can have a core with a smaller or a larger diameter than the 200 micron core diameter, as will be discussed in later paragraphs.

A suitable light source is an Optek OPF370A LED emitting light at 850 nm wavelength. The detector can be a silicon PIN photodiode.

The housing 130 can be a tube with an inner diameter slightly larger than the reflector body and the optical fiber 110. Suitable housing materials are those with a higher coefficient of expansion than the optical fiber 110, or higher than both the optical fiber 110 and the reflector body 120. For example, if the optical fiber 110 is primarily silica glass, suitable tubing materials include metals such as aluminum and stainless steel, high COE glasses such as borosilicate glass, and high COE plastics.

Alternatively, the housing can be a material with a smaller thermal expansion coefficient than the optical fiber and the reflector body, such as a high silica glass or invar, which is a nickel steel alloy (64FeNi) notable for its very low coefficient of thermal expansion.

The reflective surface 122 can be a metallic reflective film such as gold, aluminum, silver, copper, titanium, or alloys thereof, or another type of reflective material. The reflective surface can also be the highly polished surface of the reflector body. Examples include highly polished aluminum or other metals.

An adhesive, mechanical fasteners, or chemical fasteners can be used to affix the multimode fiber and the reflector body to the tubing.

The reflector body 120 is preferably thick and/or stiff enough to prevent or minimize motion of the reflective surface due to changes in external pressure on the sensor.

FIG. 1A illustrates the reflector body 120 as a separate component than the housing 130. However, it is also contemplated that the reflector body can be integrally formed with the housing, or can be formed as an end cap adhered to the housing, with a reflective surface or coating on the internal face of the end cap facing the multimode fiber.

FIG. 2A illustrates a fiber optic temperature sensor 200 suitable for use in both high temperature and low temperature applications. The, the optical fiber 210, the reflector body 220, and the housing 230 are formed of glass, with the housing having a higher coefficient of thermal expansion than the reflector body and the optical fiber. The sensor 200 includes one transmitting and receiving multimode optical fiber 210 with a silica based multimode core 214 and a glass clad 216 whose coating has been removed at the sensor. The reflector body 220 can be formed of the same multimode glass fiber as the transmitting and receiving fiber 210. The glass fiber can have a reflective surface 222 facing the transmitting and receiving multimode optical fiber 210 to reflect the incident light emitted from the end of the transmitting and receiving fiber 210. The reflective surface 222 can be a metallic reflective film such as gold, aluminum, silver, copper, titanium, or alloys thereof, or another type of reflective material. The metallic films can be evaporated on the face of the glass fiber 220.

The housing 230 can be formed of a high thermal expansion capillary glass tubing and can be thermally fused to the transmitting and receiving glass fiber 210. The thermal fusion can be accomplished with a CO2 laser and a lens to uniformly fuse the capillary tubing to the fiber, around the circumference of the fiber. At the CO2 laser wavelength of 10.6 microns, the glass fiber and tubing are easily fused.

The capillary glass tubing that forms the housing 230 can be a borosilicate glass with a thermal expansion coefficient of approximately $5 \times 10^{-6}/^\circ$ C. This coefficient is approximately ten times higher than the thermal expansion coefficient of silica, resulting in high temperature sensitivity. Borosilicate glasses have a much lower melting temperature (approximately 1000° C.) than silica glasses (approximately 1600° C.), which allows the fusion to take place at a significantly lower temperature than the melting temperature of the silica fiber and preserves the melting point of the transmitting-receiving multimode silica fiber. The sensor 200 of FIG. 2A is appropriate for a wide range of temperatures, including much higher and much lower than room temperature applications.

FIG. 2C illustrates the sensor of FIG. 2A together with a LED light source 240 and a PIN photodetector 252. A fiber optic coupler 244 directs the input light from the LED into the multimode fiber 210, and directs the reflected light from the temperature sensor 200 to the PIN photodetector 252. The photodetector 252 produces an electrical voltage with an amplitude that corresponds to the intensity of the light detected by the photodetector. As discussed in the paragraphs describing operation of the sensor in FIG. 1A-1C, changes in voltage of the electrical signal from the photodetector indicate changes in temperature at the sensor.

FIG. 3A illustrates a fiber optic temperature sensor 300 with an optical fiber probe 310 with one multimode optical fiber 314 to transmit light, and a second multimode optical fiber 312 arranged adjacent to the first multimode optical fiber to receive reflected light from the reflective surface 322 of the reflector body 320. Light reflected from the reflective surface 322 is coupled into the receiving fiber 312. FIG. 3B is a cross sectional view of the fiber probe 310 with the two multimode optical fibers 312 and 314. The sleeve of the fiber probe can be plastic, stainless steel, ceramic, glass, or another material.

FIG. 3C illustrates the temperature sensor of FIG. 3A in a system together with a LED light source and a PIN photodetector. The reflected light in the receiving fiber 312 can be directly detected by the PIN photodetector. In contrast to the one-fiber sensors of FIG. 1A-1C and FIG. 2A-2C, that no fiber coupler is necessary in this sensor system, as the receiving fiber 312 of the sensor can continue to the PIN photodetector 352, and the transmit fiber of the sensor can extend from the LED connector into the sensor 300. Because no fiber coupler is needed, the sensor system of FIG. 3C can be significantly less expensive than the one-fiber sensor system of FIGS. 1C and 2C. Although fibers 312 and 314 are shown as extending between the LED connector, the PIN detector, and the sensor, respectively, additional optical connectors can also be included in-line in these optical paths.

The photodetector 352 produces an electrical voltage with an amplitude that corresponds to the intensity of the light detected by the photodetector. Changes in amplitude of the electrical signal indicate changes in temperature at the sensor. Sensitivity of the two-fiber sensor system of FIG. 3A-3C is comparable to the FIG. 1A-1C system.

Figure 4A:
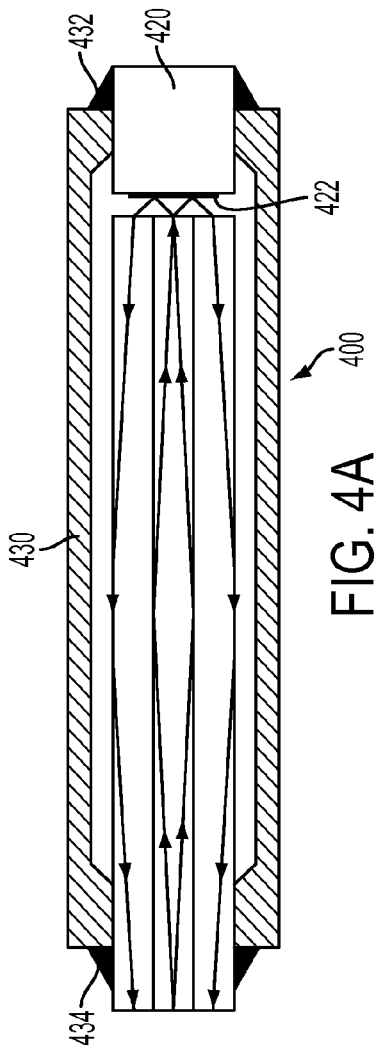

FIGS. 4A and 4B illustrate a fiber optic temperature sensor 400 with one multimode optical fiber 412 to transmit light arranged centrally within a fiber probe 410, and six multimode optical fibers 413, 414, 415, 416, 417, and 418 surrounding the central fiber 412 to receive reflected light from the reflective surface 422 of the reflector body 420. The light reflected from the reflective surface is coupled into the receiving fibers 413, 414, 415, 416, 417, and 418. The receiving fibers transmit the received reflected light to a photodetector 452, where the intensity of the light is detected, an output electrical signal is generated. FIG. 4B is a cross sectional view of the fiber probe 410. In this example, the multimode fibers are primarily silica, have a 200 micron core, a cladding, and numerical aperture of 0.37 mm. The fiber probe has an outer diameter of 1.27 mm.

The housing 430 can be a high thermal expansion coefficient tubing. In this example, the tubing has an inner diameter of 1.37 mm, and an outer diameter of 1.83 mm.

The seven-fiber temperature sensor 400 is more sensitive than the one or two-fiber sensors of FIGS. 1A and 2A, respectively. However, the seven-fiber temperature sensor has a larger diameter, so is suitable for applications in which the larger size is acceptable.

The fiber optic probe can have a sleeve 419 surrounding the optical fibers 412-419. The sleeve can be plastic, stainless steel, ceramic, glass, or another material.

To form the sensor 400, the reflector body 420 with reflective surface 422 is inserted in the stainless steel tube a distance from the end of the tube and is glued in place at the end of the tube with a strong adhesive. The fiber probe 410 is inserted into the opposite end of the tube. One method for positioning the fiber probe is to monitor the detected light from the six receiving fibers while inserting the fiber probe into the tube. When the detected light intensity reaches the desired level, the fiber probe is adhered to the end of the tube. The overall length of the tube L in this example is about 1.04 cm.

Figure 4C:
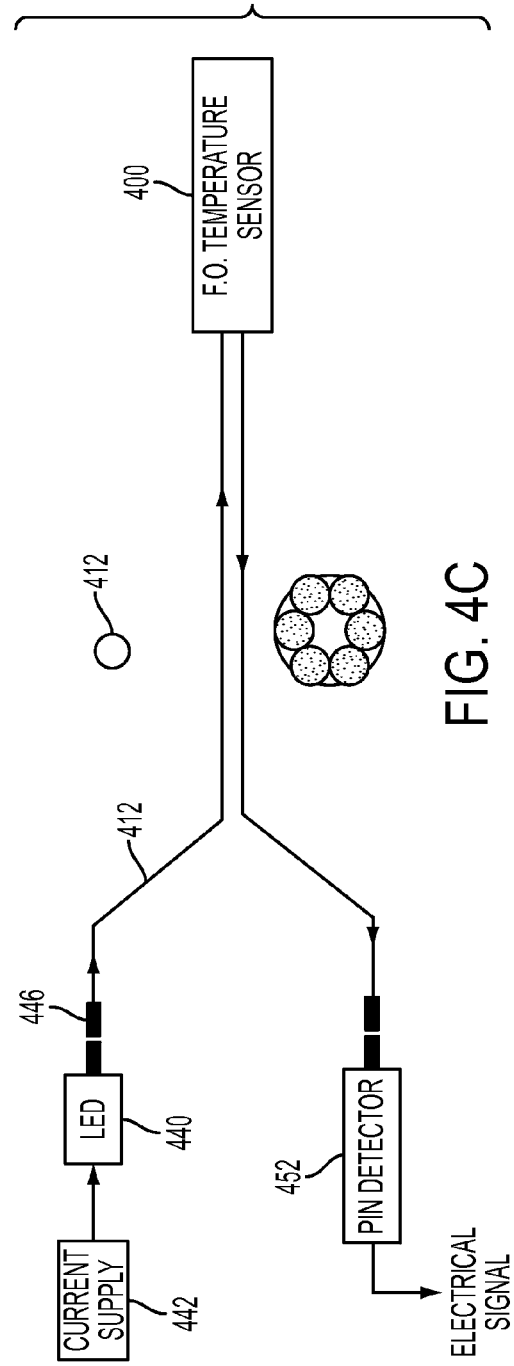

FIG. 4C shows the fiber optic temperature sensor 400 in operation. The sensor is positioned in the environment whose temperature is to be tested. Since the fiber probe material and the reflector body have a smaller coefficient of expansion than the stainless steel tube, the length of the stainless steel tube changes more than the lengths of the fiber probe and the reflector body. As the length of the tube changes, the distance between the end of the fiber probe and the reflective surface d will change. As the distance d changes, the amount of light received in the receiving fibers 413-418 changes. A photodetector 452 receives the light from the receiving fibers 413-418, and converts the light into electrical signal. By evaluating the voltage output at the photodetector, the temperature change can be determined.

FIG. 5A illustrates a fiber optic temperature sensor 500. The sensor 500 has a fiber optic probe 510 with a reference fiber for reducing the noise effects of the LED system, the PIN detection system, and the sensor leads. The optical fiber probe 510 includes one centrally arranged multimode fiber 512 that transmits light from the LED source, a first multimode fiber 514 for receiving reflected light from the reflective surface of the reflector body, and second, reference, multimode receiving fiber 516. The first and second receiving fibers 514, 516 are arranged opposite each other on opposite sides of the transmitting fiber 512. A solid, transparent, thin material 518 covers the end of the fiber probe 512 that faces toward the reflective surface 522. A reflective film 524 or other reflective material partially covers the surface of the thin transparent material 518, as shown in FIG. 5A and FIG. 5D. The reflective film 524 is arranged over the end of the second receiving fiber 516 so a portion of the light emitted from the end of the transmitting fiber 512 is reflected by the reflecting film 524 and is received by the second receiving fiber 516. The reflected light entering the second receiving fiber 516 will not have been transmitted through the gap between the end of the fibers and the reflector surface 522, so the amount of light received by the second receiving fiber 516 will not be affected by any change in path length due to temperature or other environmental factors.

A portion of the light emitted from the end of the transmitting fiber 512 is not intercepted by the reflector surface 524. This remaining portion of light is transmitted through the air gap toward the reflective surface 522 of the reflector body 520. A portion of the light reflected by the reflective surface 522 is received in the first receiving fiber 514. The amount of light received in the first receiving fiber 514 is indicative of the change in distance between the fiber ends and the reflective surface 522.

Each of the receiving fibers 514 and 516 transmits the reflected light to a different photodetector. Photodetector 454 receives the light from the first receiving fiber 514 (the "sensor" receiving fiber) and photodetector 452 receives light from the second receiving fiber 516 (the "reference" receiving fiber). The voltage from the photodetector 452 is subtracted from the voltage from the signal photodetector 454, and the difference is indicative of the temperature.

Subtraction of the reference voltage from the signal voltage can reduce the noise effects due to the LED, the PIN detection system, sensor leads, and other common components.

The thin transparent material at the end of the fiber probe can be a silica glass or other transparent material. In an embodiment of the invention, the thin transparent material 518 is a small part of a microscope slide.

The sensor system of FIG. 5A-5D can have significantly better performance than the one or two-fiber systems, due to the system's compensation for noise effects. However, the FIG. 5A-5D reference fiber temperature sensor system is more complex, with a fiber probe that includes three fibers, rather than one or two, and a detection system having two photodetectors, rather than one.

Fiber-optic probes having one, two, and seven optical fibers are tested and compared for displacement sensitivity as described in the following paragraphs.

Figure 6:
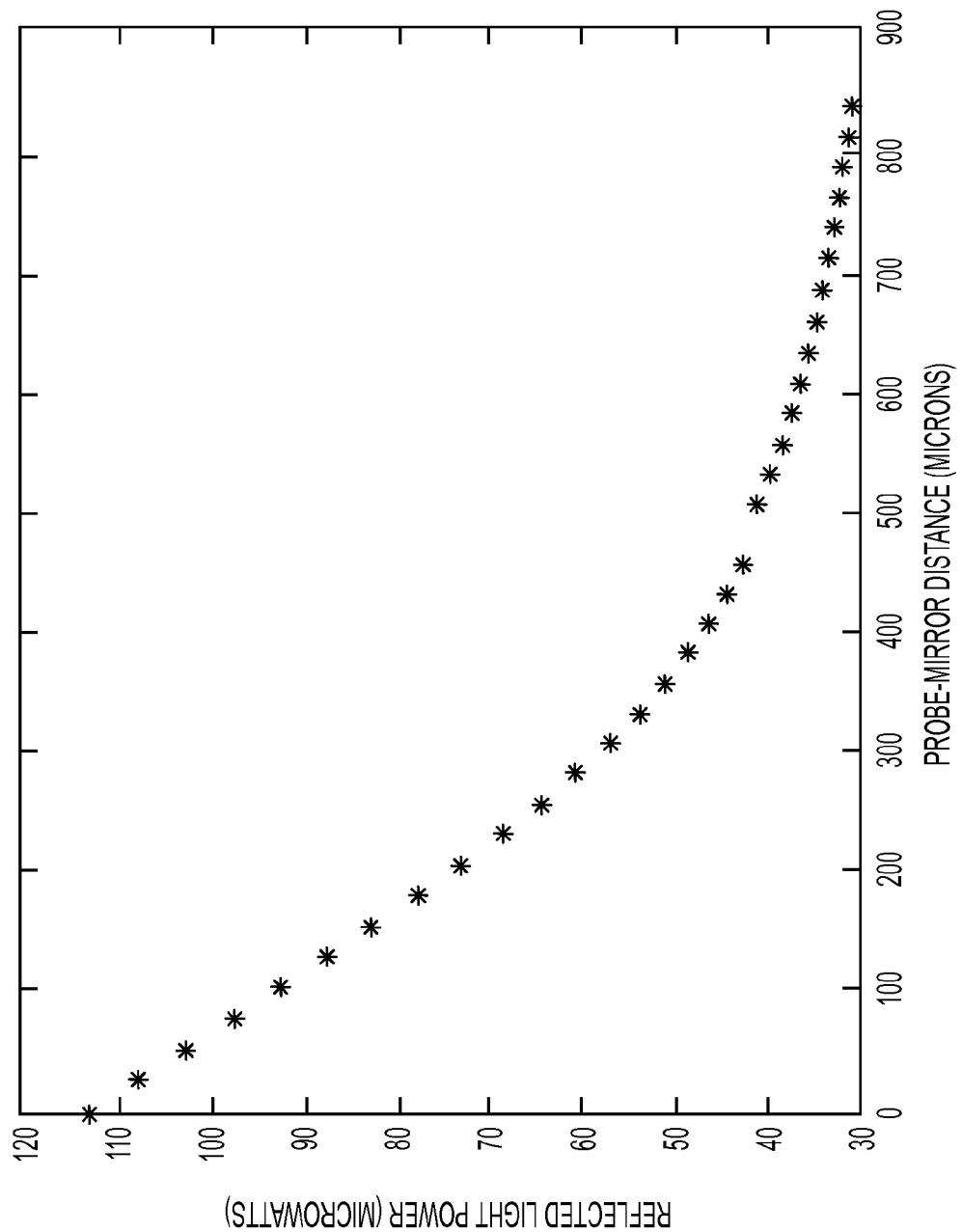
FIGS. 6 and 7 illustrate test results for a one-fiber optical fiber probe.
Figure 7:
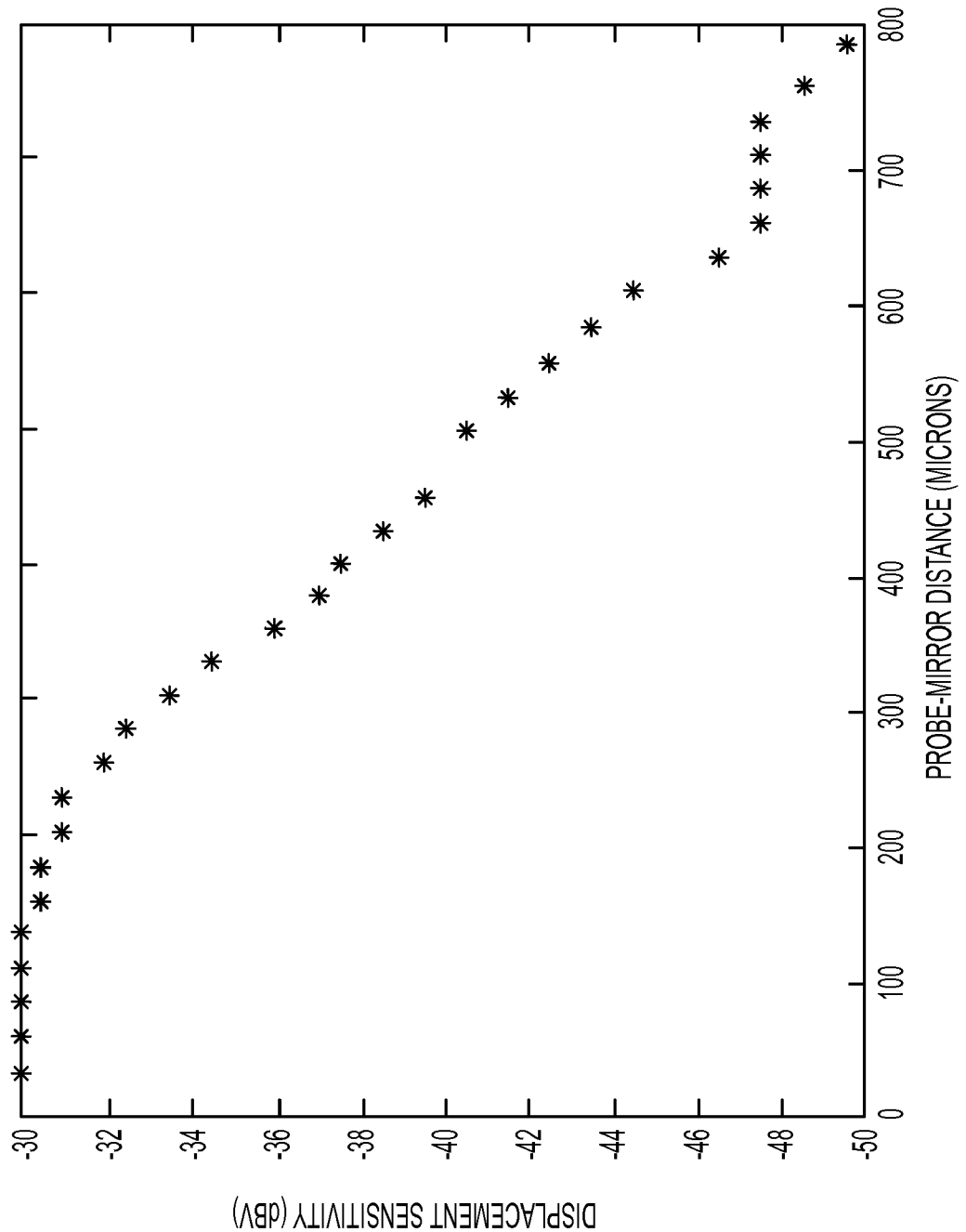

FIGS. 6 and 7 illustrate test results for a one-fiber optical fiber probe, similar to the multimode fiber probe of FIG. 1A-1B. The tested fiber optic probe has a multimode fiber with a 100 micron glass core radius, a 230 micron diameter plastic clad (HCS, Spectran Specialty Optics), a 500 micron diameter Tefzel coating, and a 0.37 numerical aperture. The fiber probe has a stainless steel housing that has a 902 micron outer diameter and a 584 micron inner diameter. The light source is a Optek OPF370A LED emitting light at 850 nanometer wavelength, and the detector is a silicon PIN. A coupler is arranged to direct the reflected light to the photodetector. The coupler is a 50/50 (at 850 nm wavelength), low loss, fiber coupler available commercially from Gould Electronics.

The one-fiber probe is mounted on a micrometer translator that is manually displaced against a mirror mounted on a piezoelectric transducer 60 (PZT-4 cylinder of 2" o.d. and 3" length) which could be vibrated electrically. The one-fiber probe displacement sensitivity is obtained by displacing manually the probe against the mirror in of 25.4 micron increments using the micrometer translator. The results of this experiment are shown in FIG. 7, in which the reflected light coupled into the same fiber is plotted vs. the distance between the end of the fiber probe and the mirror. As can be seen from this figure, maximum displacement sensitivity is achieved in the zero to about 150 micron range.

The one-fiber probe is then dynamically displaced against the minor by vibrating the PZT transducer electrically. The displacement amplitude of the vibrating minor is obtained from the output of a small reference accelerometer mounted close to the mirror. The reference accelerometer is an Endevco 2250A model. FIG. 7 illustrates the results of this experiment, with the ac displacement sensitivity plotted as a function of the probe-mirror distance. As can be seen from this figure, the sensitivity is maximum and approximately constant in the 0-150 micron region, in good agreement with the dc displacement results of FIG. 6. FIGS. 6 and 7 show that for this one-fiber probe, an optimum distance between the reflecting surface and the end of the fiber probe is about 60 microns and an optimum operating region is between 0 and about 180 microns. For good dynamic range, it is suitable to set the gap distance at a distance of between about 20 microns and 120 microns, or between 60 and 120 microns. A temperature sensor based on this one-fiber probe can be operated with a larger gap length, however, the reflected light and the displacement sensitivity will be less.

Figure 8:
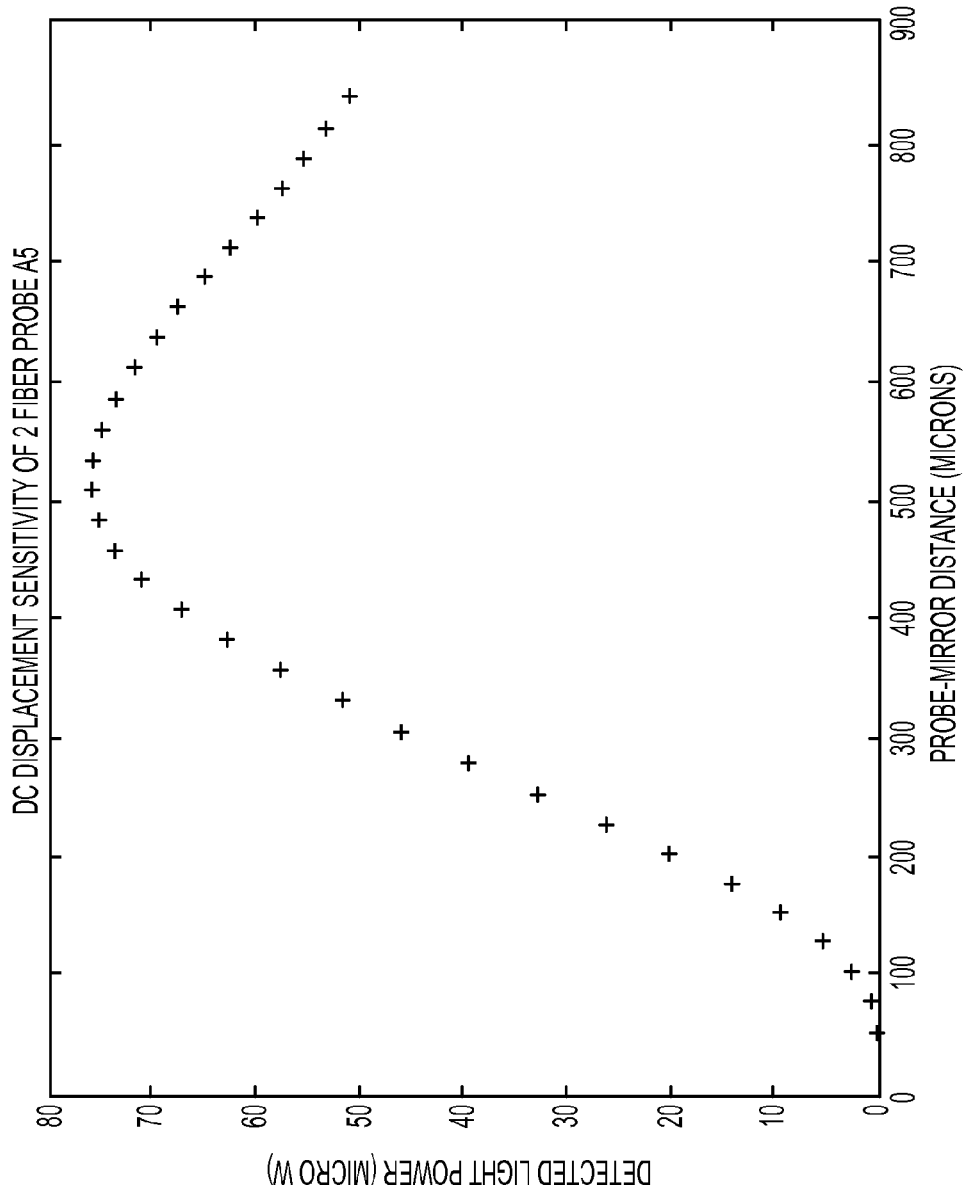
FIGS. 8 and 9 illustrate experimental performance of a two-fiber fiber optic probe.
Figure 9:
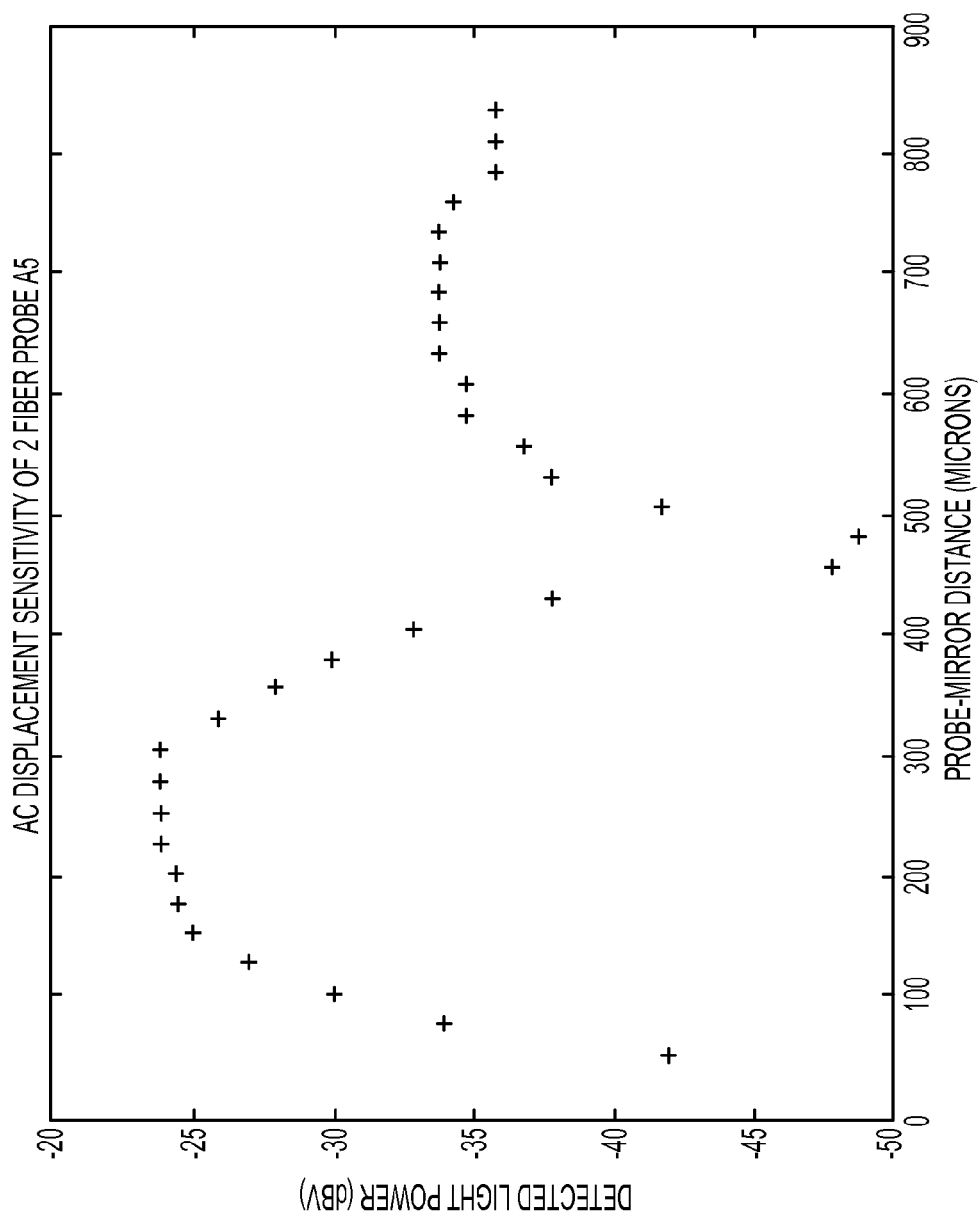

Experimental performance of a two-fiber fiber optic probe is shown in FIGS. 8 and 9. For the two fiber probe, the coating is stripped from the optical fibers using a stripper having a 305 micron diameter blade hole and the fibers are inserted in a stainless steel tubing (1.270 mm outer diameter and 838 micron inner diameter. Epoxy is applied on the 2 fibers, and the fibers are forced into a bundle close to the tubing end with the transmitting fiber at the center of the bundle. After the epoxy is cured, the fiber bundle is cut closely to the tubing end and the fiber probe is polished very well.

The two fiber probe displacement sensitivity is obtained by displacing manually the probe against the mirror in of 25.4 micron increments using the micrometer translator. The dc displacement sensitivity of this two fiber probe is shown in FIG. 8, which plots the reflected light power coupled into the one receiving fiber versus the probe-minor distance. The maximum displacement sensitivity is achieved for a fiber end-to-minor distance in the range of about 180 to about 250 microns. The ac displacement sensitivity is found by exciting electronically a PZT transducer in the manner described above. Good agreement is found between the ac and dc results.

Figure 10:
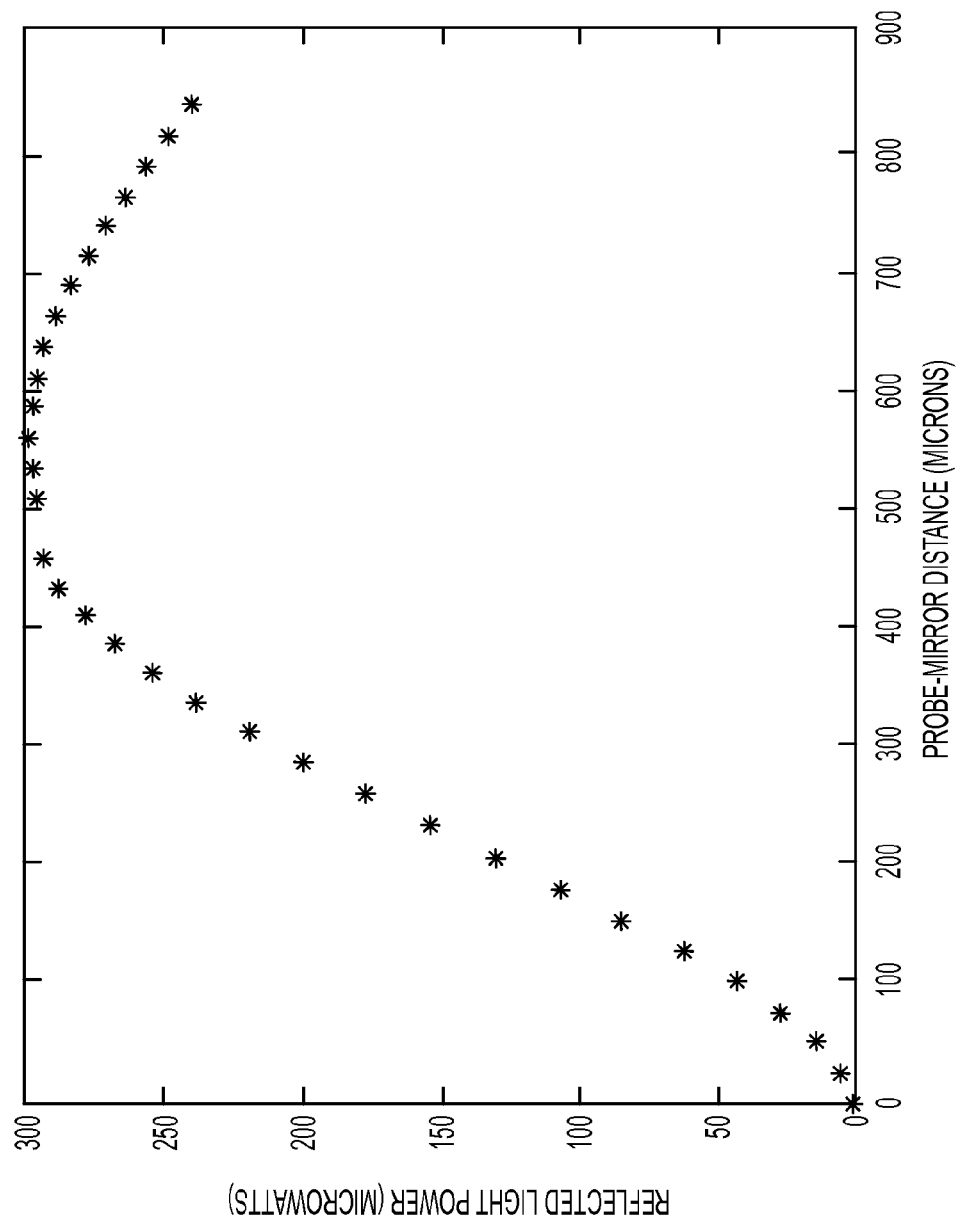
FIGS. 10 and 11 illustrate experimental performance of a seven-fiber fiber optic probe.
Figure 11:
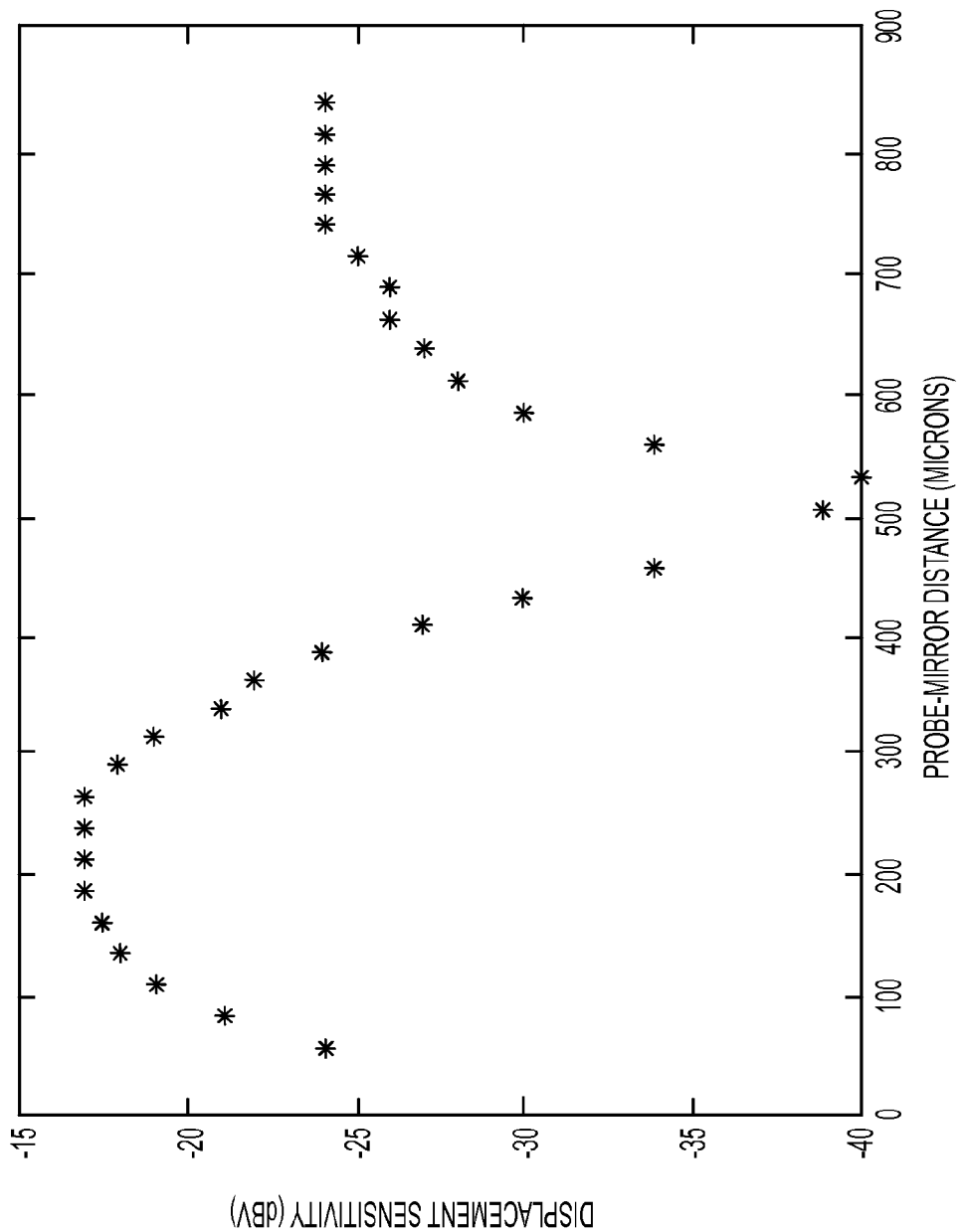

Experimental performance of a seven-fiber fiber optic probe is shown in FIGS. 10 and 11. For the seven-fiber probe, the coating is stripped from each of the seven multimode optical fibers using a stripper having a 305 micron diameter blade hole and the fibers are inserted in a stainless steel tubing with a 1.270 mm outer diameter and a 838 micron inner diameter. Epoxy is applied to the 7 fibers, and the fibers are forced into a symmetric bundle close to the tubing end with the transmitting fiber at the center of the bundle. After the epoxy is cured, the fiber bundle is cut closely to the tubing end and the fiber probe end is polished very well.

The seven-fiber probe displacement sensitivity is obtained by manually displacing the probe against the mirror in 25.4 micron increments using the micrometer translator. The resulting dc displacement sensitivity of this seven-fiber probe is shown in FIG. 10, which plots the reflected light power coupled into the six receiving fibers versus the probe-minor distance. The maximum displacement sensitivity is achieved for a fiber end to reflector distance in the range of about 180 to about 250 microns. In this range, the dc displacement sensitivity is $9.38 \times 10^{-11}$ Watts per Angstrom.

Note that the maximum sensitivity region of the seven-fiber probe is found at a higher gap distance than the one-fiber probe, which has its maximum sensitivity near zero. Another difference is that the seven-fiber probe detects significantly higher light power. This is believed to be due primarily to the coupler used in the one-fiber probe, which reduces the light power by at least 50%.

The seven-fiber probe is also dynamically displaced against the mirror by vibrating the PZT transducer electrically. The displacement amplitude of the vibrating minor is obtained from the output of a small reference accelerometer mounted close to the mirror. In this set-up, the reference accelerometer is an Endevco 2250A model, but other accelerometers can be used. FIG. 11 plots the resulting ac displacement sensitivity as a function of the probe-mirror distance. As can be seen from this figure, maximum displacement sensitivity is achieved in the probe-mirror distance range of about 180-250 microns. This is in good agreement with the dc displacement results of FIG. 10. Over this range of probe-mirror distances, the sensitivity is approximately constant.

The maximum displacement sensitivity range can be used to select an optimum probe-reflecting surface distance of about 220 microns for a seven-fiber temperature sensor. Note that the probe-minor distance can be set outside of the 180-250 micron range, however, the displacement sensitivity will be less. In applications in which a higher reflected light power is more important than sensitivity, the probe mirror distance can be selected to be in the approximately 600 to 800 micron range.

By comparing FIGS. 7 and 11, it can be also seen that the maximum ac displacement sensitivity of the seven-fiber probe is about 13 dB higher than that of the one-fiber probe. The multimode coupler is also an additional expense that is not required for the seven-fiber probe. Therefore, in applications in which low cost and high ac sensitivity is desired, a seven-fiber probe based strain sensor can be a better choice. In applications in which a small diameter is needed, a one fiber probe can be selected.

The displacement sensitivity of the seven-fiber probe can be calculated based on the amount of light received by the PIN photodetector and the reference accelerometer and was found to be $6.35 \times 10^{-11}$ Watts per Angstrom. This displacement sensitivity is slightly less than the sensitivity ($9.38 \times 10^{-11}$ W/A) found from the dc displacement experiment. In general, these results show that the displacement sensitivity is approximately the same across a range from the minimum detectable displacement to the displacements used in the dc experiment (0.1 mm). The dynamic range of the seven-fiber probe is approximately eight orders of magnitude.

The minimum detectable displacement was obtained by using a OPF 370A Optek LED driven at 100 mA current by a LDX-3620 Lightwave Technology power supply used in the battery operated mode. The detector was a TIA-500 Terahertz Technologies Inc. PIN detector, the output of which was stored into a 3582A HP spectrum analyzer. The fiber optic probe signal obtained with a known mirror displacement was compared to the noise which was the signal obtained with the minor stationary. From that comparison the minimum detectable displacement was found to be 0.1 Angstroms/$(Hz)^{1/2}$ for f<5 kHz, and 0.04 Angstroms/$(Hz)^{1/2}$ for f>5 kHz. This minimum detectable displacement is limited primarily by the noise of the LED and its current source.

Additional information about optimizing and selecting probe-reflector distances, multimode fiber numerical aperture, and other sensor characteristics for intensity based multimode fiber sensors is found in U.S. patent application Ser. No. 12/113,749, the entire disclosure of which is incorporated by reference herein.

FIGS. 12A and 12B illustrate an example of a seven-fiber fiber optic temperature sensor 700. The sensor housing 730 is stainless steel tube with an inner diameter of 1.37 mm and an outer diameter of 1.83 mm. The reflective body 720 is an aluminum rod with an outer diameter of 1.27 mm. The length L of the sensor 700 is 1.02 cm. Each of the fibers 712, 713, 714, 715, 716, 717 and 718 in the fiber probe 710 is a multi-mode fiber with a 200 micron diameter core and a numerical aperture of 0.37. The fiber probe 710 has an outer diameter of approximately 1.27 mm.

The seven-fiber temperature sensor of FIGS. 12A and 12B is tested by placing the sensor is placed in a furnace that is formed by heating a coiled wire placed in a groove in a ceramic cylinder between two glass cylinders of one meter length.

The light source is an Optek OPF370A LED emitting light at a center wavelength of 850 nm. The photodetector is a silicon PIN. The light from the LED is coupled into the transmitting fiber and propagates to the well polished end of the fiber probe, where it leaves the fiber, propagates in the air gap, and is reflected back by the reflecting surface of the small cylinder. Part of the reflected light is coupled back into the six receiving fibers surrounding the transmitting fiber. The light is detected by the PIN photodetector. The dc output of the detector is read by a light power meter, which, in this example is a S370 model commercially available from United Detector Technology. A thermometer 730 is placed in the furnace 710 to measure the temperature.

Figure 13:
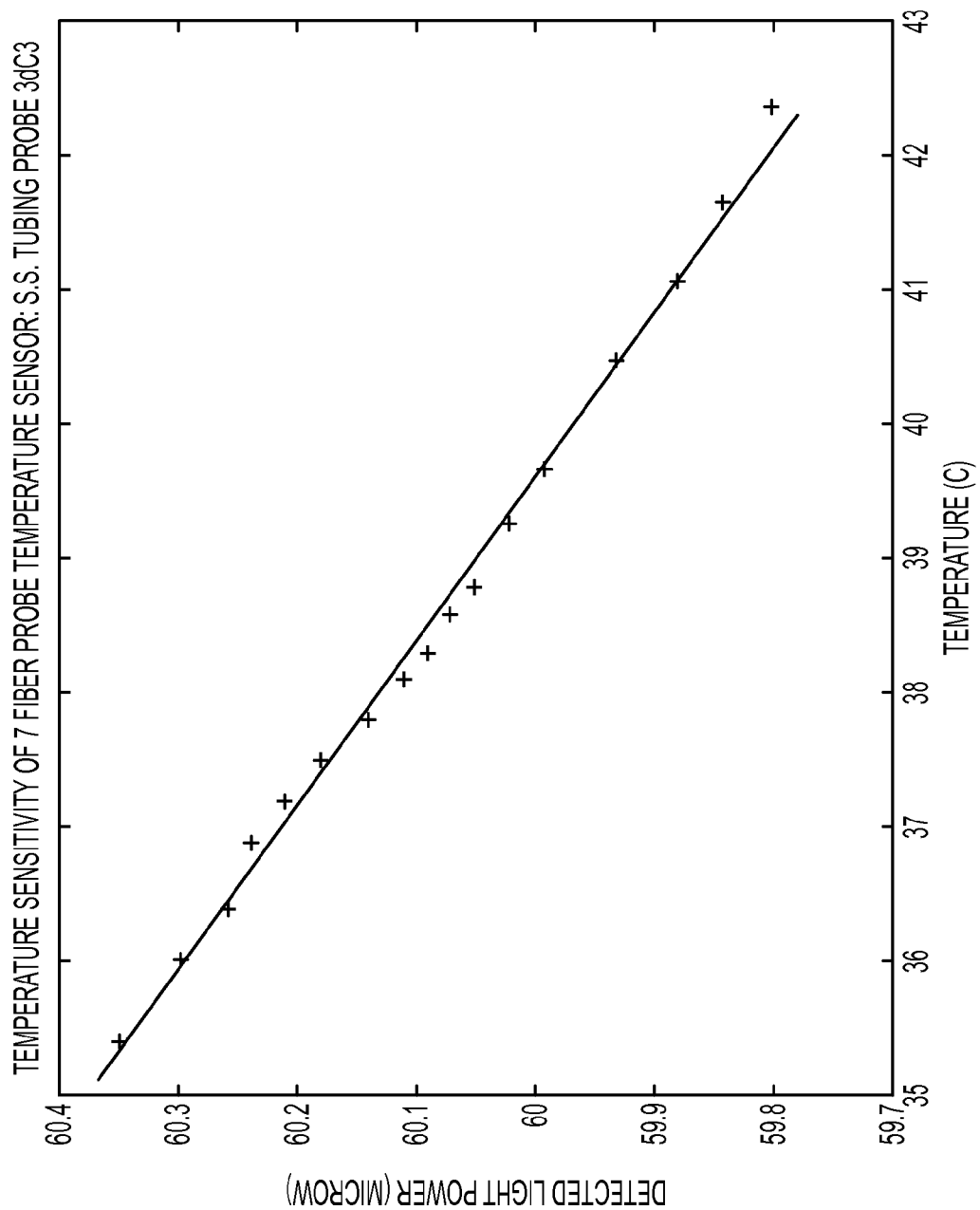
FIG. 13 illustrates test results for the seven-fiber fiber optic temperature sensor of FIGS. 12A and 12B.

FIG. 13 shows the results of the experiment for the seven-fiber stainless-steel-housing temperature sensor of FIGS. 12A and 12B, and plots detected light power versus temperature over a range of 35 to 43 C. The results show that as the temperature increases, the detected light power decreases.

Figure 14:
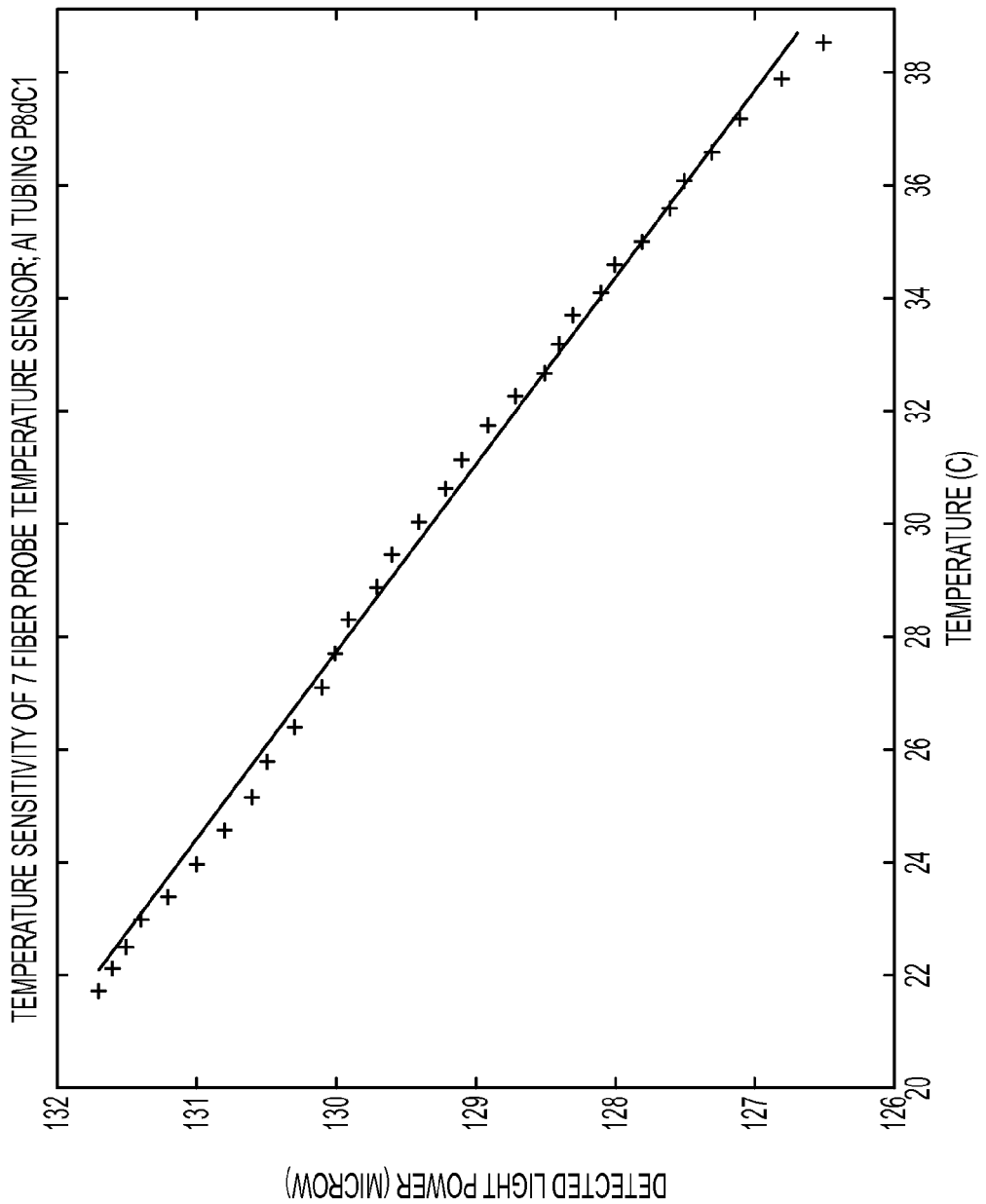
FIG. 14 illustrates test results for a seven-fiber fiber optic temperature sensor having an aluminum housing.

Another embodiment of the temperature sensor includes an aluminum tubing housing instead of the stainless steel housing of FIG. 12A. The aluminum tubing has an outer diameter of 0.094 inches, an inner diameter of 0.066 inches, and is 1.8 centimeters in length. FIG. 14 shows the results of the testing the sensor with the aluminum tubing housing, and plots the detected light power versus temperature over a range of 21 to 38 C. The figure shows that as the temperature increases, the detected light power decreases.

Figure 15:
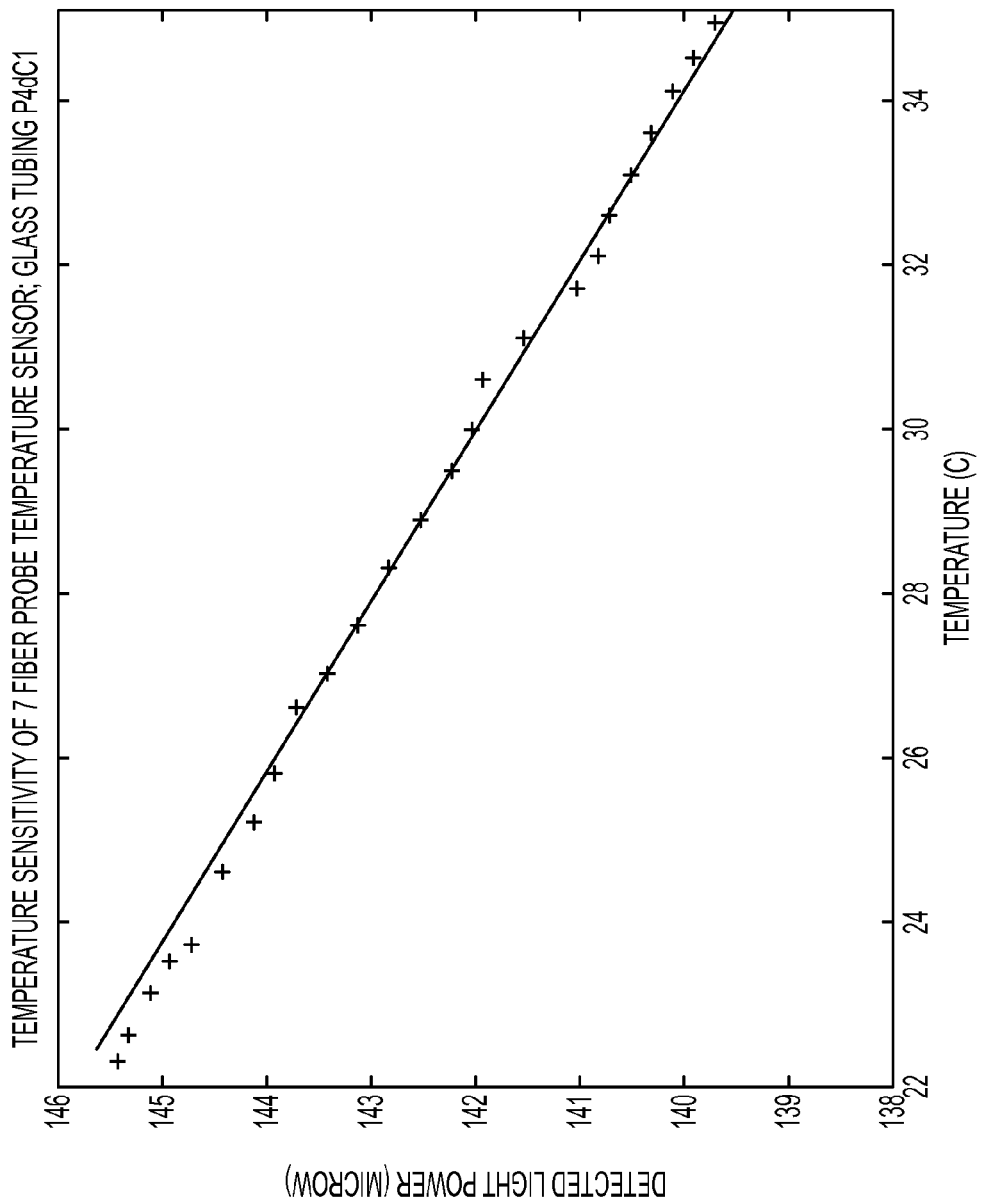
FIG. 15 illustrates test results for a seven-fiber fiber optic temperature sensor having a borosilicate glass housing.

FIG. 15 illustrates the results of testing another fiber optic temperature sensor having a borosilicate housing, rather than the stainless steel housing shown in FIG. 12A. The housing was formed of a borosilicate glass tube with an outer diameter of 0.017 inches, an inner diameter of 0.06 inches, and a length of 1.8 centimeters. FIG. 15 plots the detected light power versus temperature over a range of 22 to 35 C. The figure shows that as the temperature increases, the detected light power decreases.

Some of the sensor examples have a non-glass housing, e.g., metal, that is affixed with an adhesive to the reflector body and the fiber probe. Suitable adhesives include, but are not limited to, cyanoacrylate adhesive, available under the tradenames "SUPERGLUE" or "CRAZYGLUE". Adhesives can also be cellulosic, phenolic, epoxy, or other types.

The adhesive can be applied at the ends of the tube so the entire circumferences of the fiber probe and the reflector body are adhered to the tube. However, in some embodiments, only a portion of the circumference of the fiber probe and reflector body are adhered to the tube. Moreover, the fiber probe and reflector body can be affixed to the tube by other mechanical or chemical means.

The housings for the temperature sensors described herein are not limited to the cylindrical shapes shown in these examples, and can have a square, rectangular, oval, or other cross-section. The sensors can also include a housing that has openings in its length, or that does not entirely surround the fiber probe and reflector body. However, it can be suitable to use a housing without an opening and affixed to the fiber probe and reflector body in a way that seals the interior of the sensor in order to prevent dust or other external contaminants from entering the gap between the fiber ends and the reflectors.

The fiber probe and the reflector body can also be affixed to the housing at points that are not precisely at the far ends of the housing. For example, it may be desirable to have a portion of the housing extend beyond one or both of the adhesion points, for manufacturing, handling, or other design or convenience purposes. In such embodiments, the sensor length L is considered to be the distance between adhesion points between the housing and the fiber probe, and the housing and the reflector body, respectively.

It is noted that in positioning the temperature sensors, if the sensor is adhered or affixed to a structure, strain in the structure may be transmitted to the sensor and affect the results. Thus, it can be preferable to position the temperature sensors so they are not attached to structures, or are only loosely attached to structures with freedom to move in the longitudinal direction, to avoid or minimize strain effects.

Figure 16:
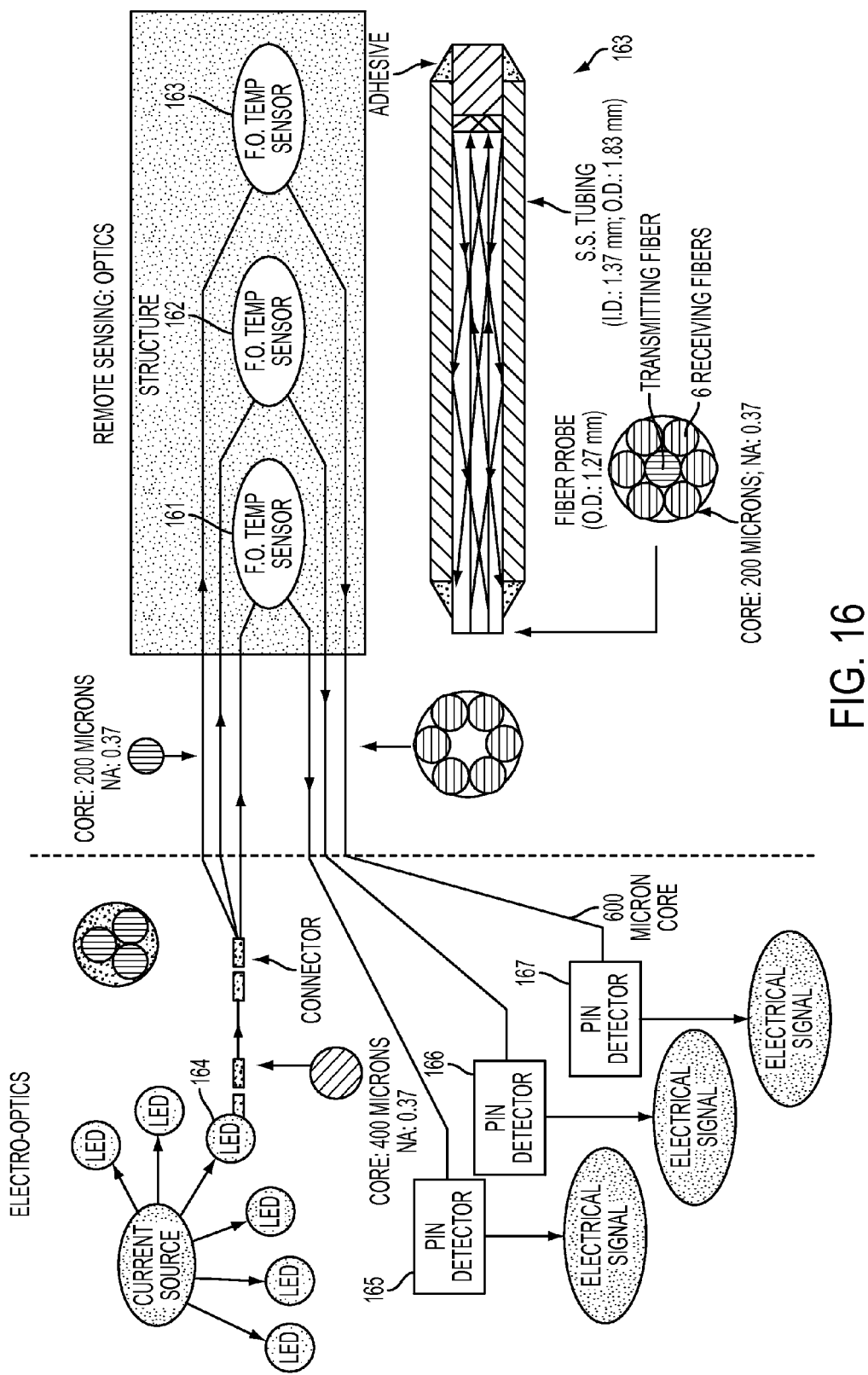
FIG. 16 illustrates a temperature measurement system that includes several LEDs, and three seven-fiber fiber optic temperature sensors per LED.

FIG. 16 illustrates a temperature measurement system that includes three seven-fiber fiber optic temperature sensors 161, 162, 163 placed in different locations. Each LED 164 provides light for three different fiber optic sensors. Each of the sensors transmits reflected light to a different PIN detector 165, 166, 167, where the light intensity is converted to an electrical signal indicating the temperature at that sensor's location. A current source can supply several LEDs. For example, in this example, the current source can supply six LEDs and, thus, can support eighteen fiber optic temperature sensors.

The LED can couple light directly into a large diameter, 400 micron core diameter, multimode fiber. The large diameter multimode fiber can be coupled to three 200 micron diameter multimode fibers for transmission to each fiber optic sensor. The system for coupling the larger diameter multimode fiber to several smaller diameter multimode fibers is described in U.S. Pat. No. 7,379,630, which disclosure is incorporated herein by reference in its entirety. Other optical fiber connectors can also be used.

Figure 17:
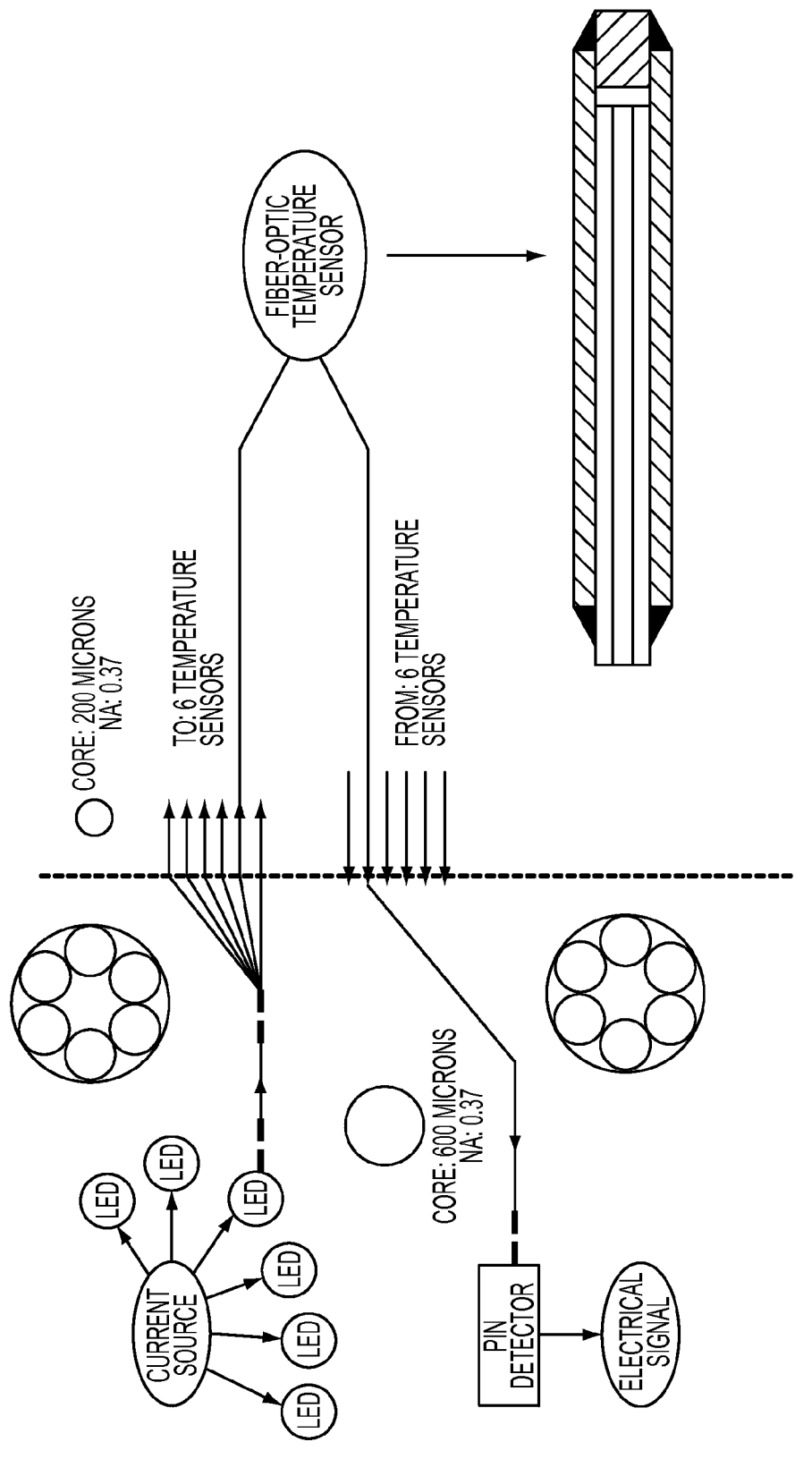
FIG. 17 illustrates a temperature measurement system that includes several LED light sources, and seven seven-fiber fiber optic temperature sensors per LED.

FIG. 17 illustrates a temperature measurement system that includes seven seven-fiber fiber optic temperature sensors. The sensors can be placed in different locations for sensing temperatures at each of the different locations. Each LED provides light for seven different fiber optic sensors. Each of the sensors transmits reflected light to a different PIN detector, which converts the light intensity to an electrical signal indicating the temperature at that sensor's location. A current source can supply several LEDs. For example, in this example, the current source can supply six LEDs and, thus, thirty-six fiber optic temperature sensors.

The LED can couple light directly into a large diameter, 600 micron core diameter, multimode fiber. The large diameter multimode fiber can be coupled to six 200-micron diameter multimode fibers for transmission to each fiber optic sensor using a connection system as described in U.S. Pat. No. 7,379,630. Other fiber optic connection systems can also be used.

Note that the sensors and methods described herein do not rely on interferometry or other coherent optical techniques to characterize the temperature. Any broadband or narrowband light source may be used.

These sensors have been described for convenience as having a housing with a larger thermal expansion coefficient than the thermal expansion coefficient of the fiber probe and reflector body. Each of these sensor systems can alternatively include a housing with a smaller thermal expansion coefficient than the thermal expansion coefficient of the sensor's fiber probe and reflector body. A large difference in the thermal expansion coefficient of the housing and the thermal expansion coefficient of the fiber probe and the reflector body will provide more sensitivity than smaller differences in thermal expansion coefficients.

Obviously, many modifications and variations of the present invention are possible in light of the above teachings. It is therefore to be understood that the claimed invention may be practiced otherwise than as specifically described.

What is claimed as new and desired to be protected by Letters Patent of the United States is:

1. A fiber-optic temperature sensor, comprising:
   a reflector body with a reflective surface;
   an optical fiber probe including a multimode optical fiber for emitting light from an end of the fiber and for receiving light reflected by the reflective surface;
   the reflective surface being spaced apart at a distance from the end of the multimode optical fiber and positioned to receive the light emitted from the end of the multimode optical fiber and to reflect at least a portion of the light into the end of the multimode optical fiber; and wherein the housing has a larger thermal expansion coefficient than the thermal expansion coefficients of the fiber probe and the reflector body, the housing being affixed to the optical fiber probe at a first location and affixed to the reflector body at a second location, wherein temperature changes are indicated by changes in reflected light coupled into the multimode optical fiber.

2. The sensor of claim 1, wherein the housing comprises aluminum, stainless steel, borosilicate glass, or plastic.

3. The fiber-optic temperature sensor according to claim 1, wherein in operation, thermal expansion or contraction of the housing causes a change in the distance between the multimode optical fiber end and the reflective surface, and the change in the distance modulates the amount of light coupled into the multimode optical fiber.

4. The sensor of claim 1, wherein the housing is affixed to the reflector body and the optical fiber probe at opposite ends of the housing.

5. The sensor according to claim 1, wherein the distance between the multimode optical fiber end and the reflective surface is at least 20 microns.

6. The sensor according to claim 1, wherein the multimode optical fiber has a core diameter of at least 10 microns.

7. The sensor of claim 1, wherein the reflector body is glass, the reflective surface is a metallic film on the reflector body, and the housing comprises glass with a higher thermal expansion coefficient than the fiber probe and reflector body.

8. The sensor of claim 7, wherein the housing is attached to the reflector body and the multimode optical fiber by thermal fusion, and wherein the glass reflector body extends from an end of the housing to the metallic film to a point at which the glass reflector body is thermally fused to the glass housing.

9. The sensor of claim 1, in combination with a broadband light source, a photodetector, and an optical coupler arranged to couple light from the broadband light source into the sensor and from the sensor to the photodetector.

10. A fiber-optic temperature sensor, comprising:
a reflector body with a reflective surface;
an optical fiber probe including a transmitting multimode optical fiber for emitting light from an end of the fiber, and at least one receiving multimode optical fiber for receiving light reflected by the reflector body;
the reflective surface being spaced apart at a distance from the end of the multimode optical fibers and positioned to receive the light emitted from the end of the transmitting multimode optical fiber and to reflect at least a portion of the light into the end of the receiving multimode optical fiber; and
a housing having a larger thermal expansion coefficient than the fiber probe and the reflector body, the housing being affixed to the optical fiber probe at a first location and affixed to the reflector body at a second location, wherein temperature changes are indicated by change in reflected light coupled into the at least one receiving multimode optical fiber.

11. The sensor of claim 10, wherein the housing comprises aluminum, stainless steel, borosilicate glass, or plastic.

12. The sensor according to claim 10, wherein in operation, thermal expansion or contraction of the housing causes a change in the distance between the multimode optical fiber ends and the reflective surface, and the change in the distance modulates the amount of light received in the at least one receiving multimode optical fiber.

13. The sensor of claim 10, wherein the at least one receiving multimode optical fiber includes a plurality of receiving multimode optical fibers arranged surrounding the transmitting multimode optical fiber.

14. The sensor of claim 13, wherein said plurality of receiving multimode optical fibers includes six receiving multimode optical fibers.

15. The sensor of claim 10, wherein the housing comprises a glass tube.

16. The sensor of claim 10, further comprising:
a LED light source for transmitting light into the transmitting multimode optical fiber.

17. The sensor of claim 10, further comprising:
a photodetector in optical communication with the at least one receiving multimode optical fiber, arranged to convert the received light into an electrical output, said output being indicative of temperature at the sensor.

18. A fiber-optic temperature sensor, comprising:
a reflector body with a reflective surface;
an optical fiber probe including a transmitting multimode optical fiber for emitting light from an end of the fiber, a first receiving multimode optical fiber and a second receiving multimode optical fiber parallel with the transmitting multimode optical fiber, a transparent glass cover arranged over the ends of the transmitting optical fiber and the receiving optical fibers, and a reflective material disposed on a portion of the transparent glass cover covering the second receiving multimode optical fiber and a portion of the transmitting optical glass fiber;
the reflective surface of the reflector body being spaced apart at a distance from the transparent glass cover; and
a housing having a thermal expansion coefficient larger than the thermal expansion coefficient of the fiber probe, the housing being affixed to the optical fiber probe at a first location and affixed to the reflector body at a second location.

19. The temperature sensor according to claim 18, wherein the housing has a thermal expansion coefficient larger than the thermal expansion coefficient of the fiber probe and the reflector body.

20. The temperature sensor according to claim 18, wherein temperature is indicated by the difference between the reflected light coupled into the first receiving multimode optical fiber and the reflected light coupled into the second receiving multimode optical fiber.

21. The temperature sensor according to claim 18, wherein in operation, thermal expansion or contraction of the housing causes a change in the distance between the transparent glass cover and the reflective surface of the reflector body, and the change in the distance modulates the amount of light received in the first receiving multimode optical fiber.

22. The temperature sensor according to claim 18, wherein said first receiving multimode optical fiber and said second receiving multimode optical fiber are arranged opposite each other on either side of the transmitting multimode optical fiber.

23. The sensor of claim 18, in combination with a LED light source for transmitting light into the transmitting multimode optical fiber, a first photodetector in optical communication with the first receiving multimode optical fiber, and a second photodetector in optical communication with the second receiving multimode optical fiber, the difference in output voltage of said first photodetector and the output voltage of said second photodetector being indicative of temperature at the sensor.

24. The sensor according to claim 18, wherein the reflector surface has a straight edge extending over the transmitting fiber, the straight edge forming a dividing line between a portion of the transmitting fiber that is not covered by the reflecting surface and the portion of the transmitting fiber that is covered by the reflecting surface.

25. The temperature sensor according to claim 10, wherein in operation, a temperature increase is indicated by a decrease in the amount of reflected light coupled into the multimode fiber.

26. The temperature sensor according to claim 10, wherein the distance between the reflective surface and the end of the optical fiber probe is in a range in which the dc displacement sensitivity is maximum, said dc displacement sensitivity being the slope of a curve of reflected light coupled into the at least one receiving multimode optical fiber versus the distance between the reflective surface and the end of the optical fiber probe.

* * * * *